US008661068B1

(12) United States Patent
Seibel et al.

(10) Patent No.: US 8,661,068 B1
(45) Date of Patent: Feb. 25, 2014

(54) MANAGING GLOBAL METADATA CACHES IN DATA STORAGE SYSTEMS

(75) Inventors: Christopher Seibel, Walpole, MA (US); Philippe Armangau, Acton, MA (US); Sitaram Pawar, Shrewsbury, MA (US); Jean-Pierre Bono, Westborough, MA (US); Diane M. Delgado, Carlisle, MA (US)

(73) Assignee: EMC Corporation, Hopkinton, MA (US)

( * ) Notice: Subject to any disclaimer, the term of this patent is extended or adjusted under 35 U.S.C. 154(b) by 91 days.

(21) Appl. No.: 13/249,008

(22) Filed: Sep. 29, 2011

(51) Int. Cl.
*G06F 17/30* (2006.01)
(52) U.S. Cl.
CPC ............................. *G06F 17/30132* (2013.01)
USPC ........................................................ 707/825
(58) Field of Classification Search
CPC ................................................ G06F 17/30132
USPC .............................................................. 707/825
See application file for complete search history.

(56) References Cited

U.S. PATENT DOCUMENTS

| | | | |
|---|---|---|---|
| 5,218,695 A * | 6/1993 | Noveck et al. ........................ 1/1 |
| 5,642,501 A * | 6/1997 | Doshi et al. .................... 707/613 |
| 5,996,047 A * | 11/1999 | Peacock ........................ 711/118 |
| 7,631,155 B1 * | 12/2009 | Bono et al. .................... 711/156 |
| 8,204,871 B1 * | 6/2012 | Pawar et al. .................. 707/705 |
| 2004/0107318 A1 * | 6/2004 | Bono et al. .................... 711/118 |
| 2005/0065986 A1 * | 3/2005 | Bixby et al. ................... 707/204 |
| 2005/0251500 A1 * | 11/2005 | Vahalia et al. ..................... 707/1 |
| 2007/0192444 A1 * | 8/2007 | Ackaouy et al. .............. 709/219 |
| 2007/0250552 A1 * | 10/2007 | Lango et al. .................. 707/205 |
| 2009/0125669 A1 * | 5/2009 | Gupta et al. ................... 711/103 |

* cited by examiner

*Primary Examiner* — Etienne Leroux
*Assistant Examiner* — Dara J Glasser
(74) *Attorney, Agent, or Firm* — Krishnendu Gupta; Deepika Bhayana

(57) ABSTRACT

A method is used in managing global metadata caches in data storage systems. Space is allocated in a memory of a data storage system to a global metadata cache which is configured to store metadata objects for a plurality of different file systems responsive to file system access requests from the plurality of different file systems. A metadata object associated with a file of a file system of the plurality of different file systems is stored in the global metadata cache. The metadata object is accessed by a plurality of different versions of the file.

20 Claims, 25 Drawing Sheets

MANAGING GLOBAL METADATA CACHES IN DATA STORAGE SYSTEMS

BACKGROUND

1. Technical Field

This application relates to managing global metadata caches in data storage system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be as many as five levels of indirect blocks arranged in an hierarchy depending upon the size of a file where each level of indirect blocks includes pointers to indirect blocks at the next lower level.

Further, a file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file. Snapshot copies are in widespread use for on-line data backup. If a file becomes corrupted, the file is restored with its most recent snapshot copy that has not been corrupted.

A file system based snapshot copy facility is described in Bixby et al. U.S. Patent Application Publication 2005/0065986 published Mar. 24, 2005, incorporated herein by reference. When a snapshot copy of a file is initially created, it includes only a copy of the file. Therefore the snapshot copy initially shares all of the data blocks as well as any indirect blocks of the file. When the file is modified, new blocks are allocated and linked to the file to save the new data, and the original data blocks are retained and linked to the inode of the snapshot copy. The result is that disk space is saved by only saving the difference between two consecutive versions of the file. The sharing of file system data blocks conserves data storage for storing files in a data storage system. The snapshot copy facility is a space saving technology that enables sharing of file system data blocks among versions of a file.

Although existing various methods provide reasonable means of providing access to metadata of file systems, with the explosion in the amount of data being generated, the resources needed for backup, archive, and restore are rising dramatically. It may be difficult or impossible to manage efficient access to metadata of file systems in data storage systems.

SUMMARY OF THE INVENTION

A method is used in managing global metadata caches in data storage systems. Space is allocated in a memory of a data storage system to a global metadata cache which is configured to store metadata objects for a plurality of different file systems responsive to file system access requests from the plurality of different file systems. A metadata object associated with a file of a file system of the plurality of different file systems is stored in the global metadata cache. The metadata object is accessed by a plurality of different versions of the file.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
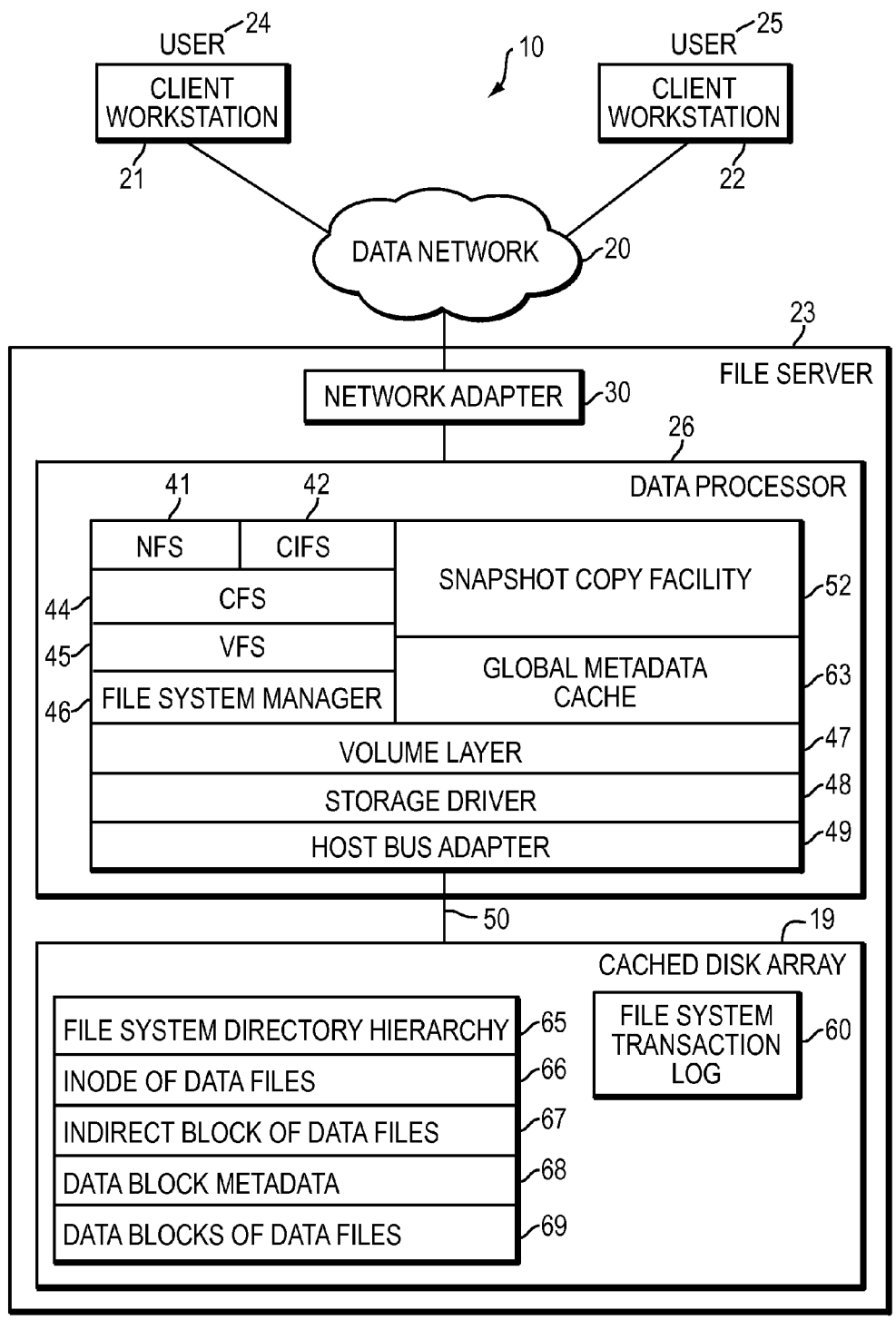
FIG. 1 is an example of an embodiment of a computer system that may utilize the techniques described herein.

Described below is a technique for use in managing global metadata caches in data storage systems, which technique may be used to provide, among other things, allocating space in a memory of a data storage system to a global metadata cache configured to store metadata objects for a plurality of different file systems responsive to file system access requests from the plurality of different file systems, and storing a metadata object associated with a file of a file system of the plurality of different file systems in the global metadata cache, where a metadata object is accessed by a plurality of different versions of the file. Further, in at least one embodiment of the current technique, the metadata object is associated with a global reusable list based on a use recency information of the metadata object.

Generally, metadata of a file of a file system which is read from a persistent storage (e.g., disk) and written to the persistent storage disk may be cached in a volatile memory (e.g., system cache) of a data storage system. Caching of metadata of a file implies that read operations read metadata of the file from the volatile memory rather than from a disk. Correspondingly, write operations may write metadata of a file to the volatile memory rather than to a disk. A file sync operation writes metadata of a file cached in a volatile memory of a data storage system to a persistent storage at a time interval that is determined by an operating system of the data storage system. Further, metadata of a file of a file system cached in a volatile memory of a data storage system may be flushed to a persistent storage based on either a load on the data storage system or a high water mark threshold value. Caching metadata of a file of a file system in a volatile memory improves performance of the file system because accessing metadata from a disk involves an I/O operation to the disk which is slower than accessing metadata from the volatile memory.

Conventionally, a data storage system includes a metadata cache such that the metadata cache stores metadata of a single file of a file system or a single file system. Thus, in such a conventional system, a metadata cache is created for each file of a file system or each file system of a data storage system. However, a large number of file systems indicate a large amount of metadata for such file systems consuming more storage resources and memory of a data storage system. Therefore, given a limited amount of memory and/or storage resources, a large number of metadata caches for the large number of file systems are unable to cache an optimal or near optimal amount of metadata for each file or file system. Further, in such a conventional system, each version of a file is associated with a separate metadata cache even though a subset of metadata (e.g., indirect blocks) of the file may be shared across one or more versions of the file. Thus, in such a conventional system, maintaining separate metadata caches for each version of a file consumes a large amount of storage resources causing a data storage system to store identical copies of shared metadata in the separate metadata caches even though identical copies of the shared metadata points to same metadata on a disk. Further, in such a conventional system, each file of a file system includes a hash table to access metadata stored in a metadata cache for that file. However, in such a conventional system, a large number of files consume a large amount of storage resources and does not allow sharing of metadata objects across one or more hash tables. Further, in such a conventional system, if a file system is unmounted, metadata objects in a metadata cache associated with the file system are removed (also referred to as "purged") from the metadata cache, which results in an additional processing of metadata.

By contrast, in at least some implementations in accordance with the current technique as described herein, creating a global metadata cache for storing metadata objects (e.g., indirect blocks, virtual block pointers) of one or more files of file systems enables a data storage system to store a single instance of a metadata object in a memory of the data storage system when the metadata object is shared across the one or more files of file systems. Thus, a single instance of a metadata object of a file that is shared across one or more versions of the file is stored in the global metadata cache allowing the one or more versions of the file to access the single instance of the metadata object. Further, in at least some implementations in accordance with the current technique as described herein, using the global metadata cache for storing metadata of file systems of a data storage system enables the data storage system to efficiently balance utilization and tuning of the global metadata cache. Additionally, in at least some implementations in accordance with the current technique as described herein, the size of the global metadata cache may be configured based on the amount of available memory of the data storage system. Further, in at least some implementations in accordance with the current technique as described herein, a global reusable list is associated with the global metadata cache of the data storage system such that a metadata object is added to the global reusable list in a least recently used manner when a client releases a reference to the metadata object which was provided to the client from the global metadata cache. A metadata object that is added to the global reusable list is either reclaimed by a client or initialized as a free metadata object. Moreover, in at least some implementations in accordance with the current technique as described herein, when a file system is unmounted, metadata objects associated with the file system are not removed from the global metadata cache thereby decreasing an amount of time required to unmount the file system. Further, in at least some implementations in accordance with the current technique as described herein, a generation count is used to track validity of a metadata object when a file system associated with the metadata object is unmounted. When a file system is re-mounted, a generation count associated with a metadata object of the file system is evaluated. Based on the evaluation, an entry in the global metadata cache pointing to the metadata object is recycled if the generation count is invalid.

In at least some implementations in accordance with the technique as described herein, the use of the managing global metadata caches in data storage systems technique can provide one or more of the following advantages: reducing foot print of a memory on a data storage system, lowering a storage cost by reducing a number of identical copies of metadata object stored in metadata caches of a data storage system, reducing I/O load on a data storage system by efficiently caching metadata objects of file systems, and improving I/O performance by enabling a data storage system to lock a metadata object efficiently.

Referring now to FIG. 1, shown is an example of an embodiment of a data storage system that may be used in connection with performing the technique or techniques described herein. The data storage system 10 includes a data network 20 interconnecting clients 21, 22 and a data storage system such as a network file server 23 (also referred to simply as "file server"). The data network 20 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 20 via a data transmission protocol such as TCP/IP. The data processor 26 is programmed with a Network File System (NFS) module 41 for supporting communication with network clients over the data network 20 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 1, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The snapshot copy facility 52 performs a copy-on-first-write to each block in a production volume, in order to save an old version ("before image") of the changed block in a snapshot volume. Details regarding such a snapshot copy facility 52 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., Replication of a Snapshot Using a File System Copy Differential," U.S. Patent Application Publication No. US 2004/0267836 published Dec. 30, 2004; Armangau et al., Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

The data network 20 may be any one or more of a variety of networks or other type of communication connections as known to those skilled in the art. For example, the data network 20 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 20 by any one of a variety of connections as may be provided and supported in accordance with the type of data network 20.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 1, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 1 is implemented using one or more data storage systems, each of the data storage systems may include code thereon for performing the techniques as described herein. In following paragraphs, reference may be made to a particular embodiment such as, for example, an embodiment in which element 10 of FIG. 1 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 1, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 3 and 4. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60. In at least one embodiment of the current technique, global metadata cache 63 stores metadata of a file of a file system in a volatile memory of data storage system 10.

Figure 2:
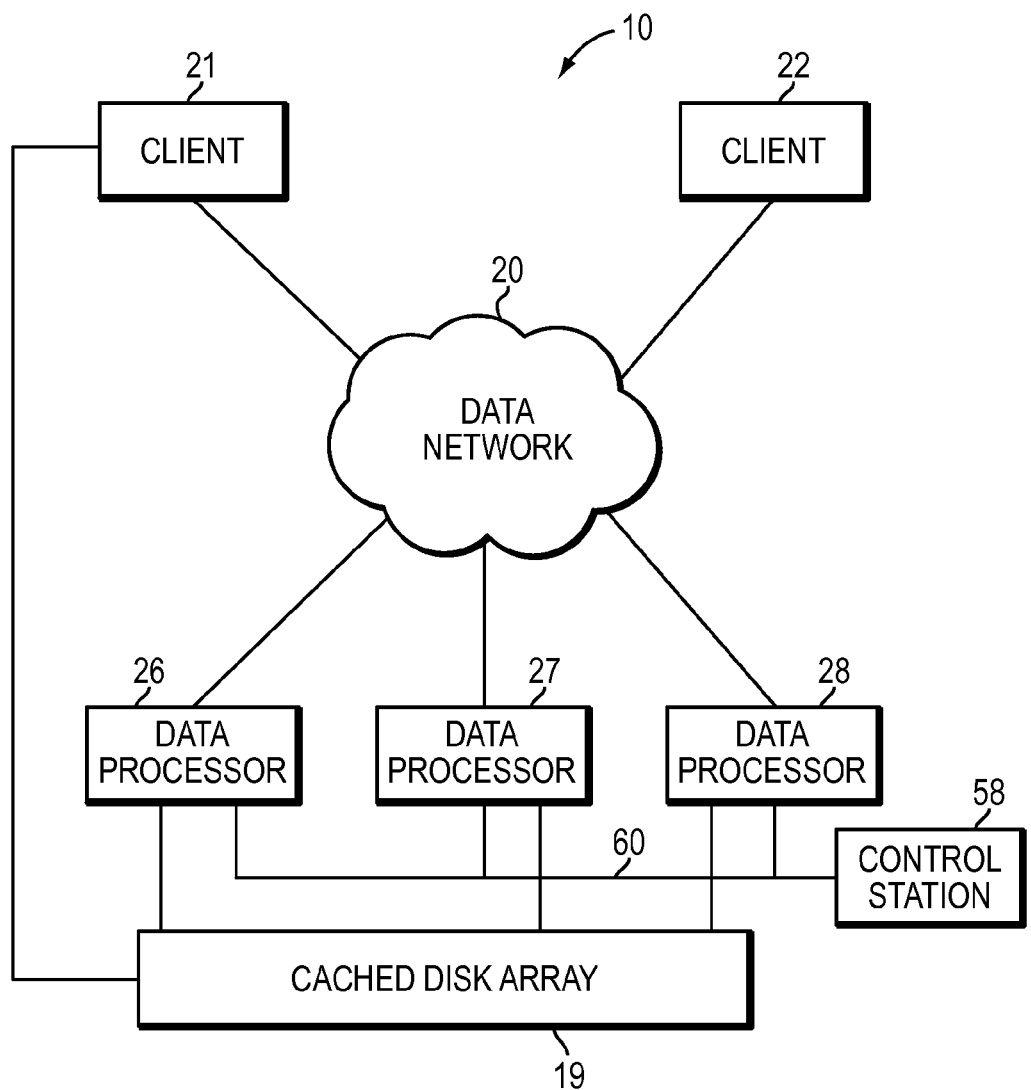
FIGS. 2-4 are diagrams illustrating in more detail components that may be used in connection with techniques herein.

Referring now to FIG. 2, shown is the network file server 23 of FIG. 1 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 3:
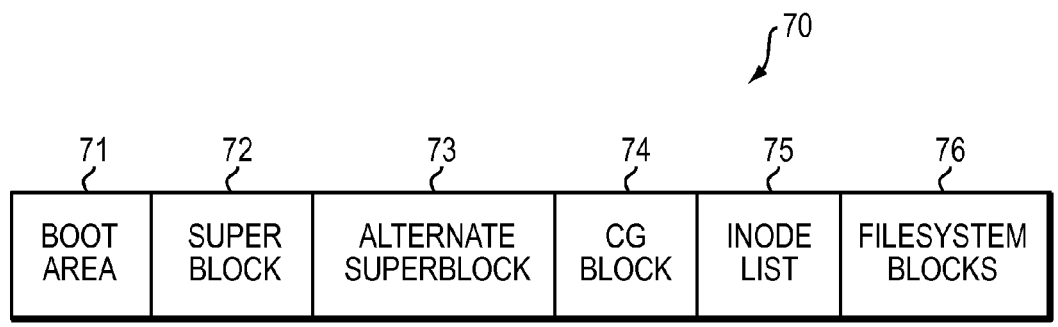

Referring to FIG. 3, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. There are at least seven block pointer entries in a block pointer array contained in an inode of a file.

Figure 4:
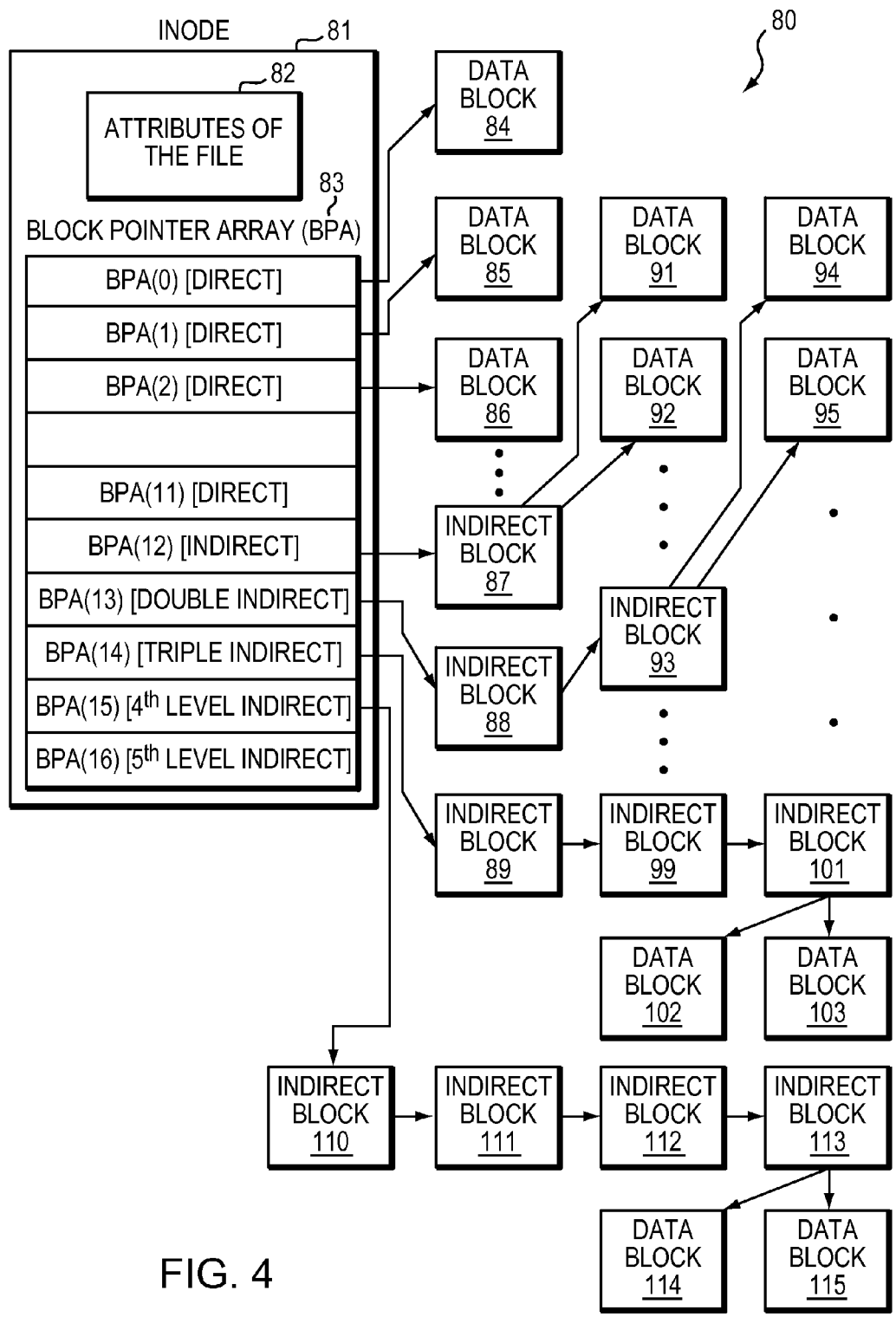

Referring to FIG. 4, shown is a representation of an inode of a file that may be included in an embodiment using the techniques described herein. A file includes an inode 81 containing attributes 82 of the file, and a block pointer array 83. The block pointer array 83 has seventeen block pointer array entries BPA(0) to BPA(16). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 99 that points to an indirect block 101 that points to one or more additional data blocks (e.g., 102, 103). Similarly the file may include fourth (BPA(15)) and fifth (BPA(16)) level of indirections indicated by indirect blocks 110-113 and data blocks 114-115.

An inode of a file is represented by in a memory of file server 23 by a vnode. A file is uniquely identified by a file system identification number in file server 23. Each data block of a file is referenced by a logical block number and/or file system block number. A file system block number of a file refers to a data block by relative position of the data block inside the file. A logical block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

In at least one embodiment of the current technique as described herein, contents of an indirect block entry of an inode of a file are stored in a memory of file server 23 using an in-memory metadata object (referred to here as "indirect block buffer cache"). An indirect block buffer cache is associated with a buffer cache block that is allocated from a buffer cache pool. Generally, an indirect block entry includes one or more pointers to data blocks. However, in some cases such as a direct mapped file, an indirect block entry may be used as a place holder for an indirect block pointer that is computed at a later time.

Generally, metadata changes of a file system resulting from an I/O request may directly be written to the file system stored on a disk, or recorded in a file system transaction log associated with the file system. A file system transaction log is used to improve performance, reliability, and recovery times of file systems. A file system transaction log for a file system offers increased reliability, because the file system transaction log may replicate some or all of the file system data and metadata which can be applied to the file system at a later time in order to make the file system metadata consistent with changes applied to data of the file system.

Typically, a file system transaction log only stores changes to metadata (such as inodes, directories, allocation maps) of a file system. If file server 23 shuts down without a failure, the file system transaction log can be discarded, because the file system stored on a persistent storage in such a case is consistent and includes all metadata changes stored in the file system transaction log. However, when file server 23 shuts down due to a failure, the file system transaction log is used to rebuild the file system in order to restore the file system to a consistent state. Generally, all write operations resulting in changes to metadata of a file system are first stored in the file system transaction log and corresponding metadata structures stored on a persistent storage are updated at a later time when metadata changes stored in a cache are written (or flushed) to the persistent storage. Thus, metadata structures stored on the persistent storage may contain stale data that is not consistent with metadata changes stored in the file system transaction log. Therefore, in such a case, the metadata changes stored in the file system transaction log are applied to the metadata structures stored on the persistent disk to recover the file system to a consistent state. The process of recovering a file system to a consistent state by applying metadata changes stored in a file system transaction log to a persistent storage is known as "replay of a file system transaction log".

Figure 5:
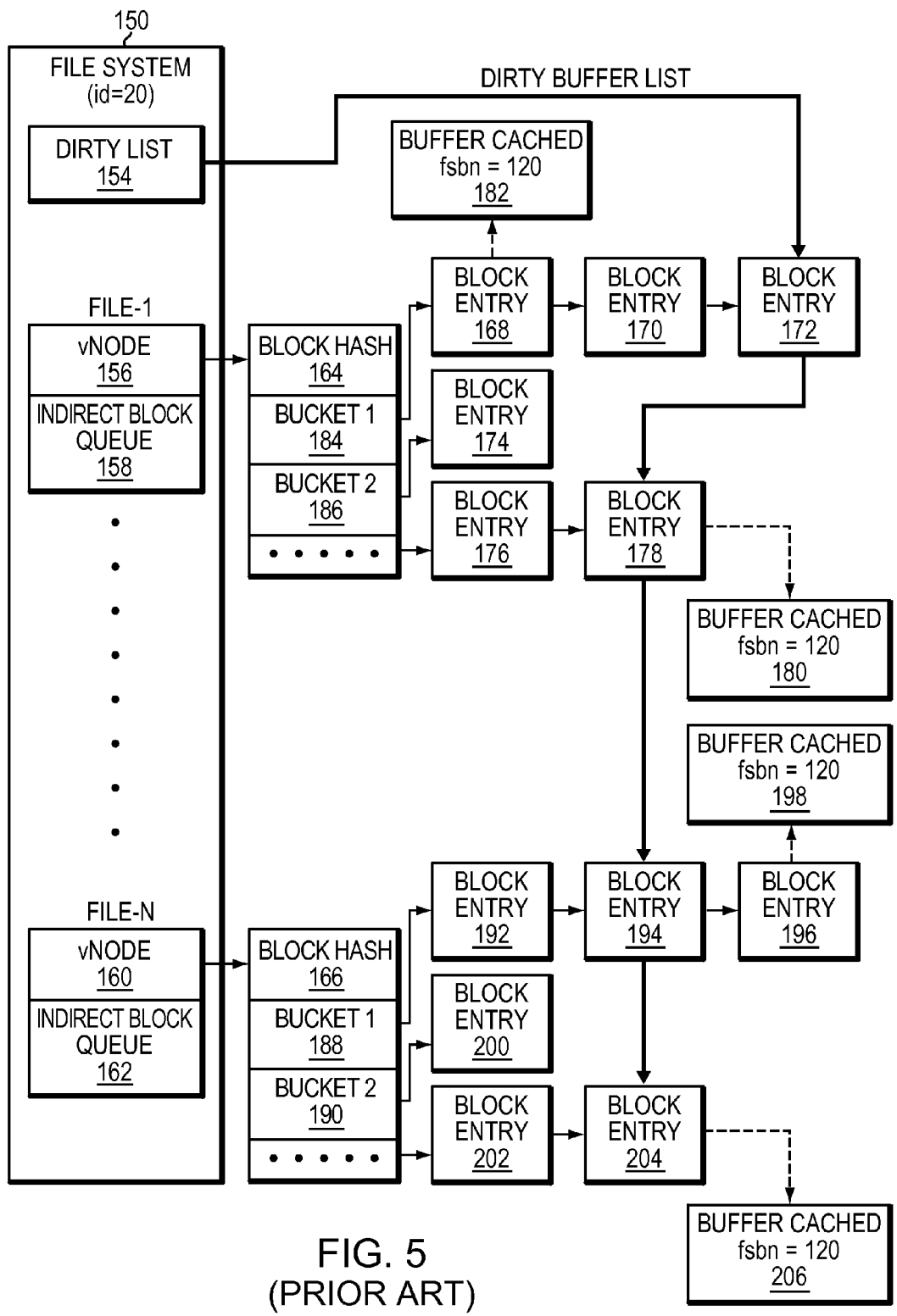
FIGS. 5-6 are diagrams illustrating in more detail components in a conventional system.

Referring to FIG. 5, shown is a representation of metadata caches for files of a file system in a conventional system. Conventionally, each file of a file system is associated with a metadata cache for storing metadata. For example, in such a conventional system, file system 150 with identification number as 20 includes files such as file-1 156, file-N 160 (other files not shown here). File-1 156 is represented by vnode 156 that indicates an inode structure of the file-1 156. Indirect block queue 158 refers to a metadata cache for storing metadata of file-1 156 such that the metadata cache is represented as a block hash table 164. The block hash table 164 caches indirect block entries such that bucket-1 184 of the block hash table 164 refers to indirect block entries 168, 170, 172, bucket-2 186 of the block hash table 164 refers to indirect block entry 174, and other buckets of the block hash table 164 refers to indirect block entries 176, 178. Each indirect block entry is associated with a buffer cache block that stores content of each indirect block entry. For example, indirect block entry 178 is associated with buffer cache block 180 that includes content of a file system data block numbered as 120. Similarly, indirect block entry 168 is associated with buffer cache block 182 that includes content of a file system data block numbered as 100.

Similarly, in such a conventional system, for example, file-N 160 of file system 150 is represented by vnode 160 that indicates an inode structure of the file-N 160. Indirect block queue 162 refers to a metadata cache for storing metadata of file-N 160 such that the metadata cache is represented as a block hash table 166. The block hash table 166 caches indirect block entries such that bucket-1 188 of the block hash table 166 refers to indirect block entries 192, 194, 196, bucket-2 190 of the block hash table 166 refers to indirect block entry 200, and other buckets of the block hash table 166 refers to indirect block entries 202, 204. Further, for example, indirect block entry 196 is associated with buffer cache block 198 that includes content of a file system data block numbered as 130. Similarly, indirect block entry 204 is associated with buffer cache block 206 that includes content of a file system data block numbered as 140. Further, file system 150 is associated with dirty list 154 that refers to indirect block entries that have been written to a file system transaction log for the file system 150 but metadata stored on a persistent storage (e.g., disk) have not been updated. For example, dirty list 154 includes indirect block entries 172, 178, 194, 204.

Figure 6:
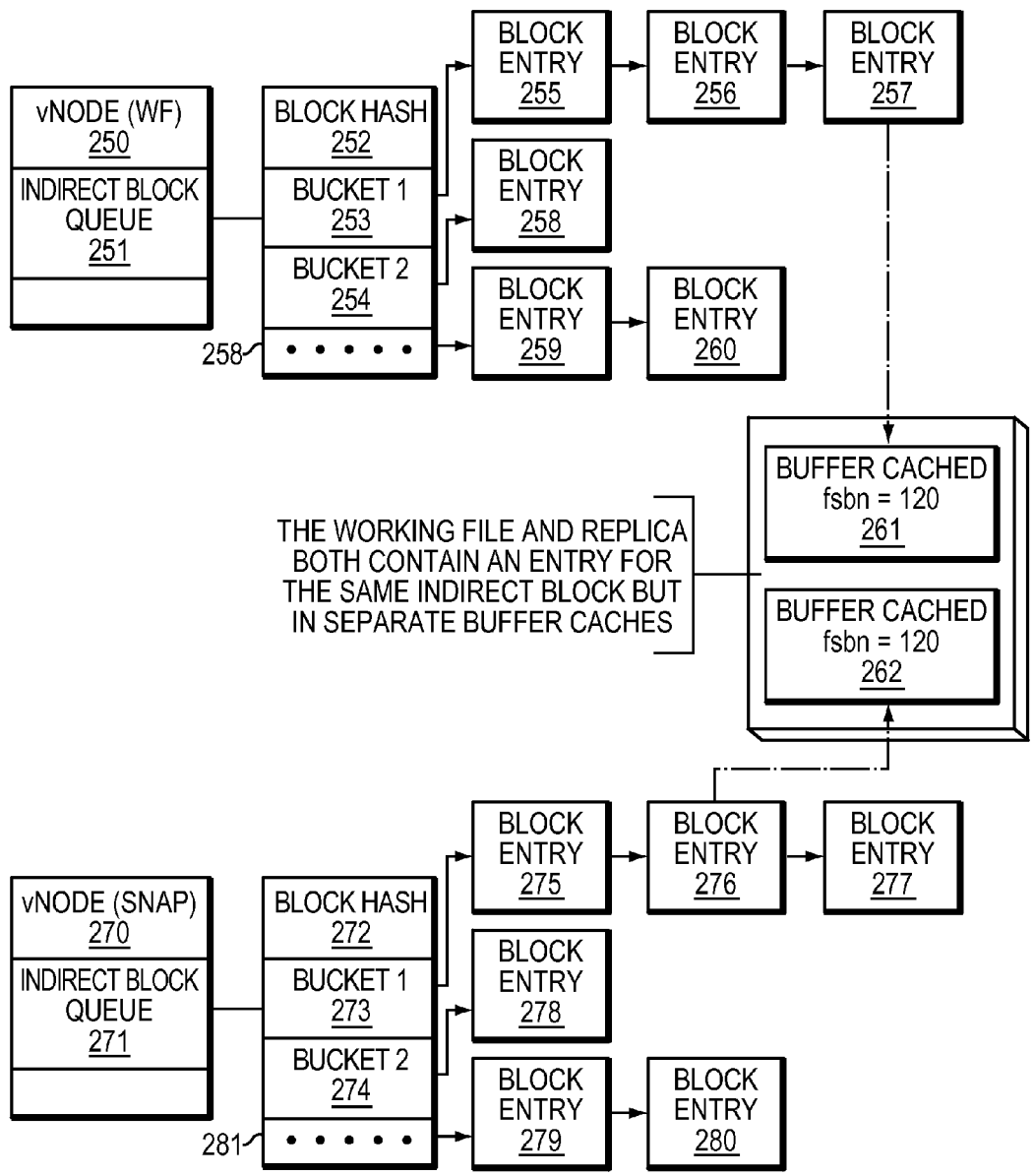

Referring to FIG. 6, shown is a representation of metadata caches for versions of a file of a file system in a conventional system. Conventionally, for example, a production file vnode 250 associated with an inode of a production file (also referred to as "working file") includes an indirect block queue 251 that refers to a metadata cache for storing metadata of working file 250 such that the metadata cache is represented as a block hash table 252. The block hash table 252 caches indirect block entries such that bucket-1 253 of the block hash table 252 refers to indirect block entries 255-257, bucket-2 254 of the block hash table 252 refers to indirect block entry 258, and other buckets of the block hash table 252 refers to indirect block entries 259, 260.

Further, for example, indirect block entry 257 is associated with buffer cache block 261 that includes content of a file system data block numbered as 120.

Further, in such a conventional system, a snapshot copy of the working file 250 is represented by vnode 270 that includes an indirect block queue 271 that refers to a metadata cache for storing metadata of the snapshot copy 270 such that the metadata cache is represented as a block hash table 272. The block hash table 272 caches indirect block entries such that bucket-1 273 of the block hash table 272 refers to indirect block entries 275-277, bucket-2 274 of the block hash table 272 refers to indirect block entry 278, and other buckets of the block hash table 272 refers to indirect block entries 279, 280. Further, for example, indirect block entry 276 is associated with buffer cache block 262 that includes content of a file system data block numbered as 120. Thus, in this example, snapshot copy 270 shares an indirect block entry with the working file 250 because both indirect block entries 257 and 276 refers to file system block number 120. However, in such a conventional system, the snapshot copy 270 maintains an independent copy of shared indirect block 276 in metadata cache 272 because a metadata cache is specific to a file or a version of the file.

Figure 7:
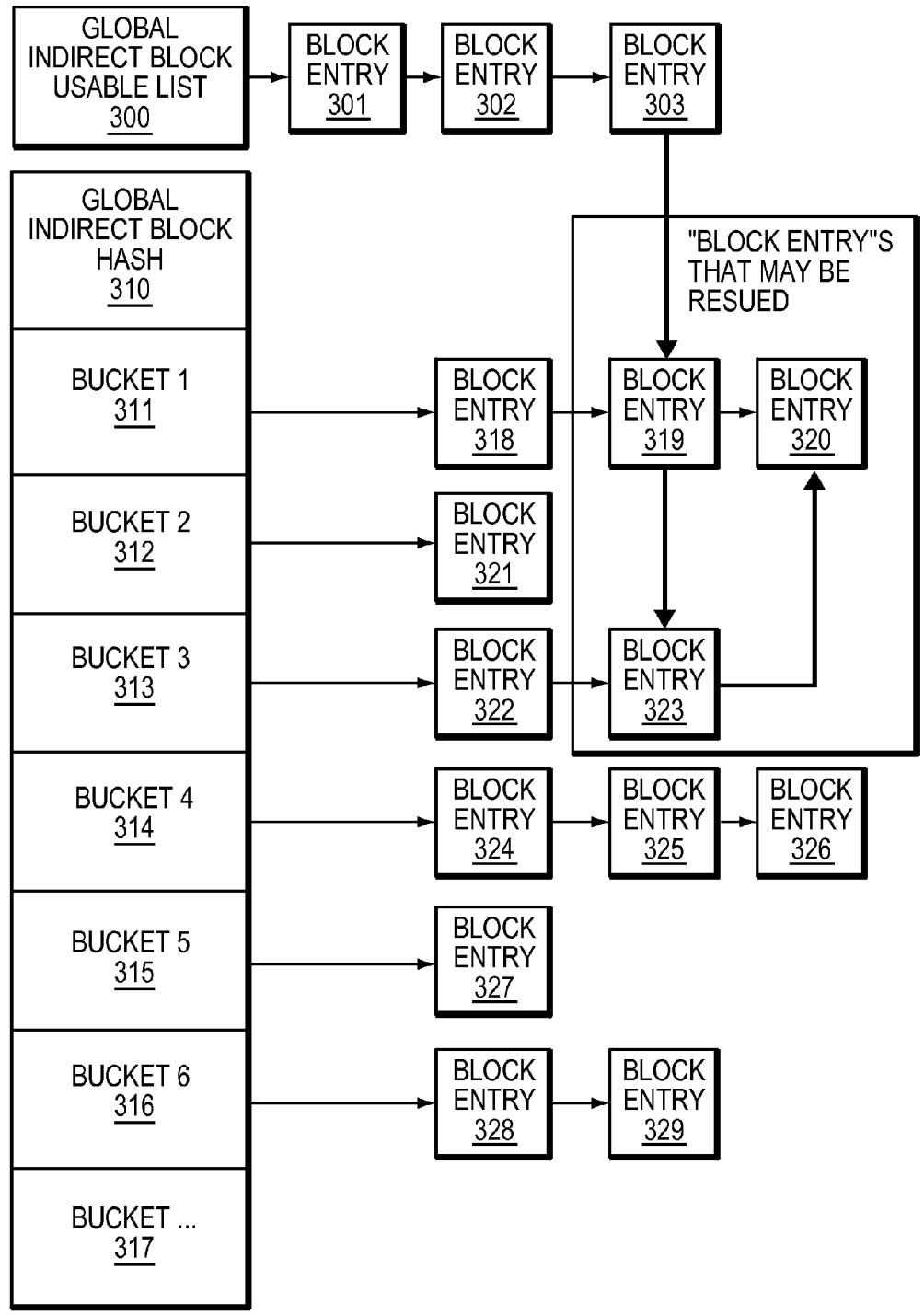
FIGS. 7-15 are diagrams illustrating in more detail components that may be used in connection with techniques herein.

Referring to FIG. 7, shown is a detailed representation of a global metadata cache that may be included in an embodiment using the current techniques described herein. In at least one embodiment of the current technique, file server 23 includes a global metadata cache that is represented by global indirect block hash 310 for storing metadata such as indirect block entries. For example, global indirect block hash 310 is organized as a set of hash buckets such that each bucket of the set of hash buckets includes one or more indirect block entries that are accessed by a hash key. Also note that within this document the term "indirect block entry" may be used interchangeably with the term "indirect block cache entry" to represent an indirect block entry. For example, bucket-1 311 refers to indirect block entries 318-320, bucket-2 312 refers to indirect block entry 321, bucket-3 313 refers to indirect block entries 322-323, bucket-4 314 refers to indirect block entries 324-326, bucket-5 315 refers to indirect block entry 327, bucket-6 316 refers to indirect block entries 328-329, and so on. The global indirect block hash enables vnodes that share indirect blocks to be associated with a single instance of a metadata cache. Additionally, file server 23 includes a global reusable pool 300 of indirect block entries that may be reused by global indirect block hash 310. The global indirect block hash 310 may grow to a pre-defined size based on an amount of available memory of file server 23 by reading an indirect block entry from a disk and storing contents of the indirect block entry in an indirect block buffer cache entry retrieved from the global reusable pool 300. Further, for example, global reusable pool 300 includes indirect block buffer cache entries 301-303 that may be provided to global indirect block hash 310 as free indirect block entries when global indirect block hash grows to add additional indirect block entries. Further, global reusable pool 300 includes indirect block buffer cache entries 319, 320, 323 that may be reused when global reusable pool 300 is left with no free indirect block entries and cannot expand to include additional indirect block entries. In at least one embodiment of the current technique, global indirect block hash 310 and global reusable list 300 are shared by one or more files (referred herein also by "vnodes") of file server 23. Therefore, an indirect block entry included in global indirect block hash 310 or global reusable list 300 is accessed using an access lock (such as a read-write lock) in order to ensure consistency of the indirect block entry when the indirect block entry is accessed by more than one vnode. An access lock is used to protect an indirect block entry that is shared across versions of a file. An access lock is acquired every time an indirect block entry of a global metadata cache is referenced for a read or write request. The life cycle of an access lock is managed by a client that acquire the access lock for referencing an indirect block entry. A client releases an access lock when the client acquires a reference to an indirect block entry.

Figure 8:
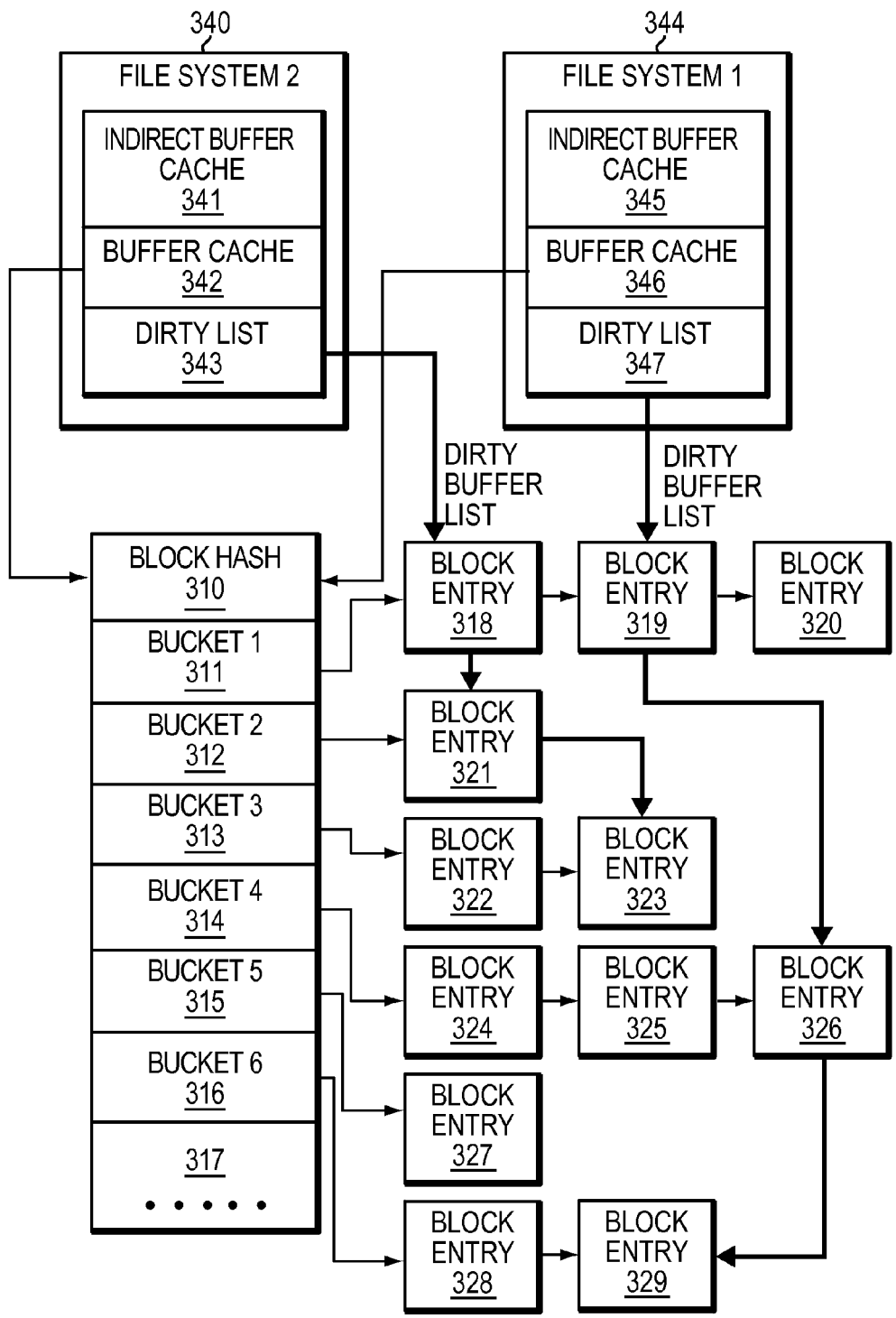

Referring to FIG. 8, shown is a more detailed representation of a global metadata cache that may be included in an embodiment using the techniques described herein. In at least one embodiment of the current technique, each file system of file server 23 includes a dirty list of indirect block buffer cache entries that have been written to a file system transaction log but updates have not been made to metadata of a file system stored on a disk. For example, file system-1 344 includes buffer cache 346 for storing data, an indirect block buffer cache 345 that points to global metadata cache 310, and dirty list 347 that points to dirty indirect block entries for file system-1 344. The dirty list 347 includes indirect block entries 319, 326, 329. Similarly, for example, file system-2 340 includes buffer cache 342 for storing data, an indirect block buffer cache 341 that points to global metadata cache 310, and dirty list 343 that points to dirty indirect block entries for file system-2 340. The dirty list 343 includes indirect block entries 318, 321, 323.

Figure 9:
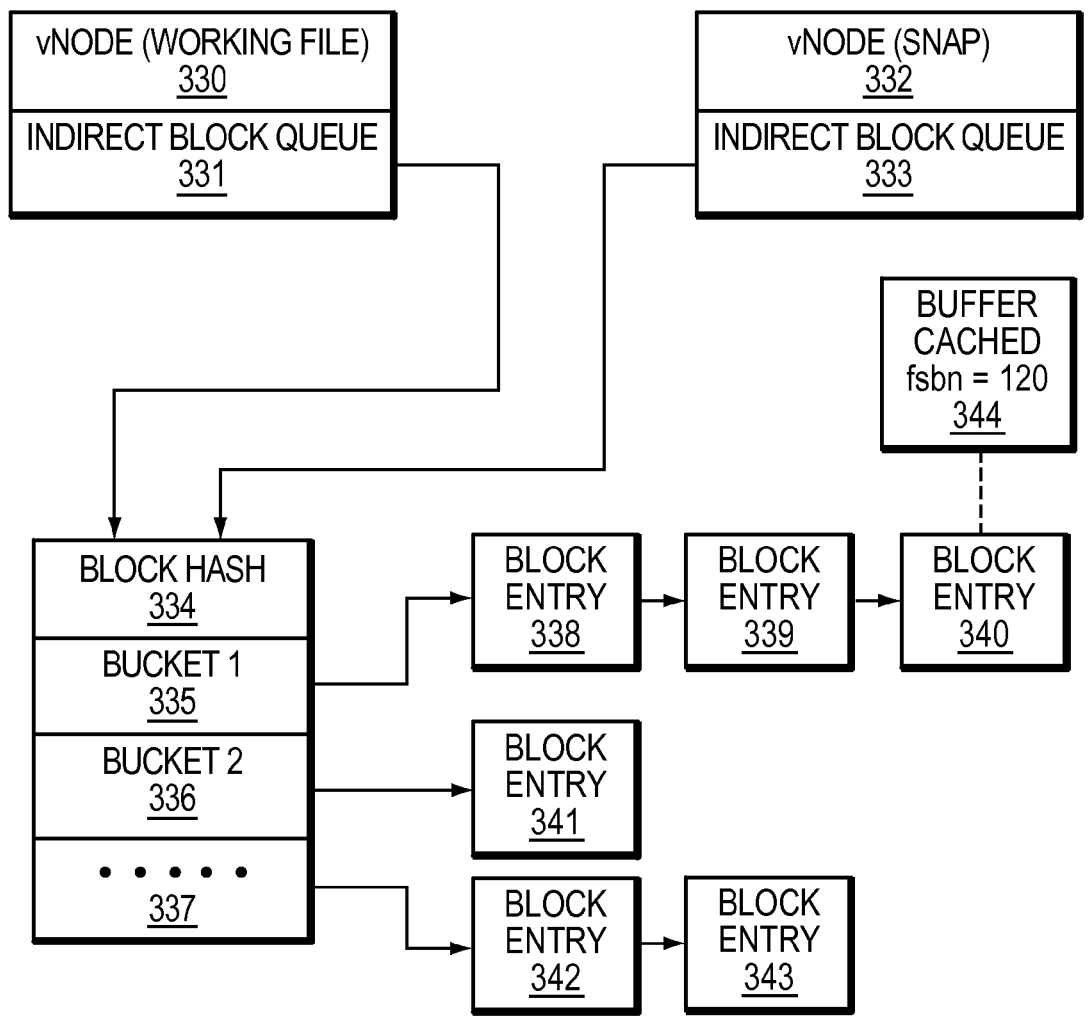

Referring to FIG. 9, shown is a more detailed representation of a global metadata cache that may be included in an embodiment using the techniques described herein. In at least one embodiment of the current technique, for example, a production file vnode 330 associated with an inode of a production file (also referred to as "working file") includes an indirect block queue 331 that refers to a global metadata cache represented by a global indirect block hash table 334. The global indirect block hash table 334 caches indirect block entries such that bucket-1 335 of the indirect block hash table 334 refers to indirect block entries 338-340, bucket-2 336 of the indirect block hash table 334 refers to indirect block entry 341, and other buckets of the indirect block hash table 334 refers to indirect block entries 342, 343. Further, for example, indirect block entry 340 is associated with buffer cache block 344 that includes content of a file system data block numbered as 120.

Further, in at least one embodiment of the current technique, a snapshot copy of the working file 330 is represented by vnode 332 that includes an indirect block queue 333 that refers to the global metadata cache represented by global indirect block hash table 334 for storing metadata of the snapshot copy 332. Thus, in this example, if snapshot copy 332 shares an indirect block entry with the working file 330, both the snapshot copy 270 and working file 330 points to same indirect block entry 340 in the global metadata cache 334 because the global metadata cache 334 is shared by the snapshot copy 270 and working file 330.

Figure 10:
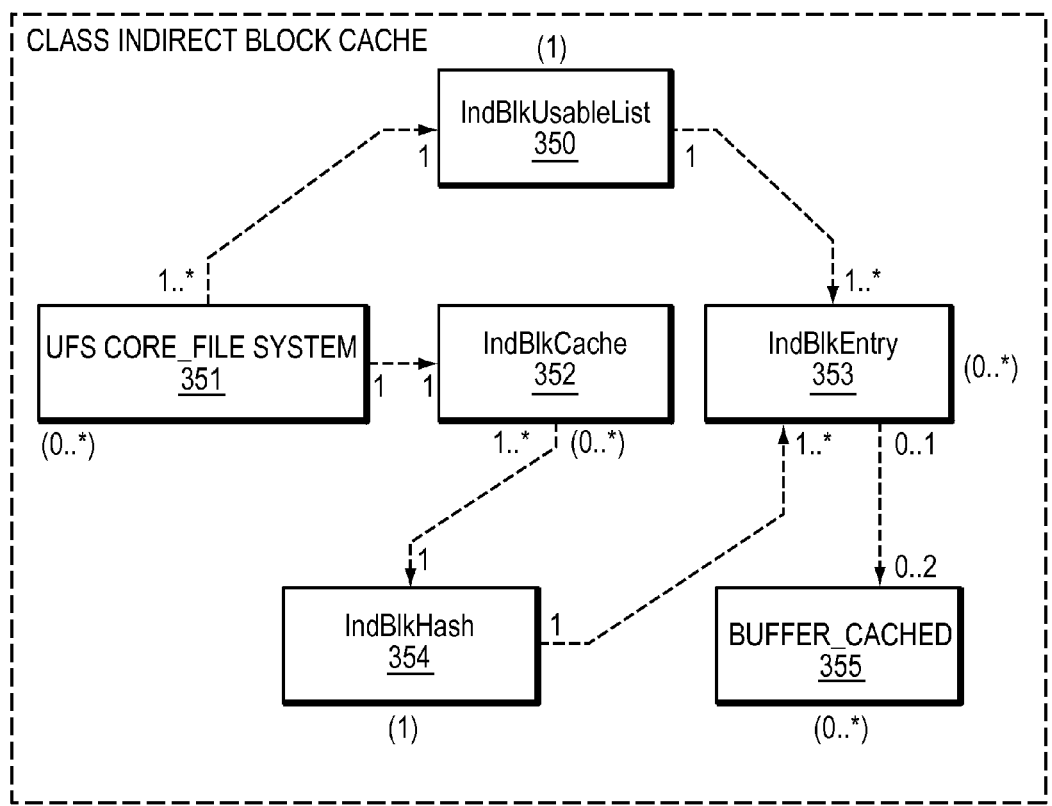

Referring to FIG. 10, shown is an example class diagram of components based on a unified modeling language (UML) that may be included in an embodiment using the techniques described herein. In at least one embodiment of the current technique, a file system class (e.g., "UFSCore FileSystem") 351 represents a file system in file server 23. Each file system represented by class "UFSCore_FileSystem" 351 includes an instance of class "IndBlkCache" 352 that manages a "per file system" dirty list and includes a set of interfaces (also referred to as "APIs" or "functions") for managing a buffer cache block associated with an indirect block entry of an inode of a file. The class "IndBlkCache" 352 refers to a global metadata cache for storing metadata (such as indirect block entries) such that the global metadata cache is represented by a single instance of class "IndBlkHash" 354. In at least one embodiment of the current technique, a global metadata cache is organized as a hash table such that the hash table includes a set of buckets. Each bucket of the set of buckets of the hash table includes a set of indirect block entries organized in a linked list such that each indirect block entry in the hash table is accessed by a hash key. Thus, class "IndBlkCache" 352 manages instances of class "IndBlkEntry" 353 such that each instance of class "IndBlkEntry" 353 refers to an indirect block entry of an inode indicated by a buffer cache block in memory that is represented by class "Buffer_Cached" 355. An indirect block entry instance of class "IndBlkEntry" 353 is locked using either a shared lock or an exclusive lock based on a usage of the indirect block entry instance by a client when a reference to the indirect block entry is provided to the client from a global indirect block cache managed by class "IndBlkCache" 352. A client (also referred to as "user") may access a buffer cache block associated with an indirect block entry represented by an instance of class "IndBlkEntry" 353. Thus, classes "IndBlkHash" 354 and "IndBlkUsableList" 350 manages indirect block buffer cache entries such that each indirect block buffer cache entry is represented by a an instances of class "IndBlkEntry" 353. Further, classes "IndBlkHash" 354 and "IndBlkUsableList" 350 are instantiated and initialized before a first file system is mounted on file server 23. A client interacts with an instance of class "IndBlkCache" 352 associated with a file system to access indirect block buffer cache entries of the file system such that an indirect block buffer cache entry is accessed by the client using a reference to an instances of class "IndBlkEntry" 353. Further, a client specifies a lock indicating whether the lock used to acquire a reference to an instance of "IndBlkEntry" 353 is a shared lock or an exclusive lock when the client issues a request to access the instance of class "IndBlkEntry" 353. Further, a client indicates a type of access for an indirect block buffer cache entry associated with an instance of class "IndBlkEntry" 353 after the client acquires a reference for the indirect block buffer cache entry. The type of access may be a read access or write access. Additionally, an unreferenced instance of an indirect block entry included in a global metadata cache is recycled when an additional instance of class "IndBlkEntry" 353 may not be created for in order to expand the global metadata cache. Also note that within this document the term "IndBlkHash" 354 may be used interchangeably with the term "global metadata cache" or "global indirect block cache" to represent a global metadata cache that stores metadata of a plurality of different file systems, files of the plurality of different file systems, and versions of the files of plurality of different file systems. Further, also note that within this document the term "Buffer_Cached" 355 may be used interchangeably with the term "buffer cache block" to indicate a buffer cache block associated with an indirect block entry. Further, also note that within this document the term "IndBlkEntry" 353 may be used interchangeably with the term "indirect block entry" to indicate an indirect block entry of an inode of a file. Further, also note that within this document the term "IndBlkUsableList" 350 may be used interchangeably with the term "global reusable list" to indicate a global reusable list including indirect block entries that may be provided to the global metadata cache 354 as free indirect block entries.

Figure 11:
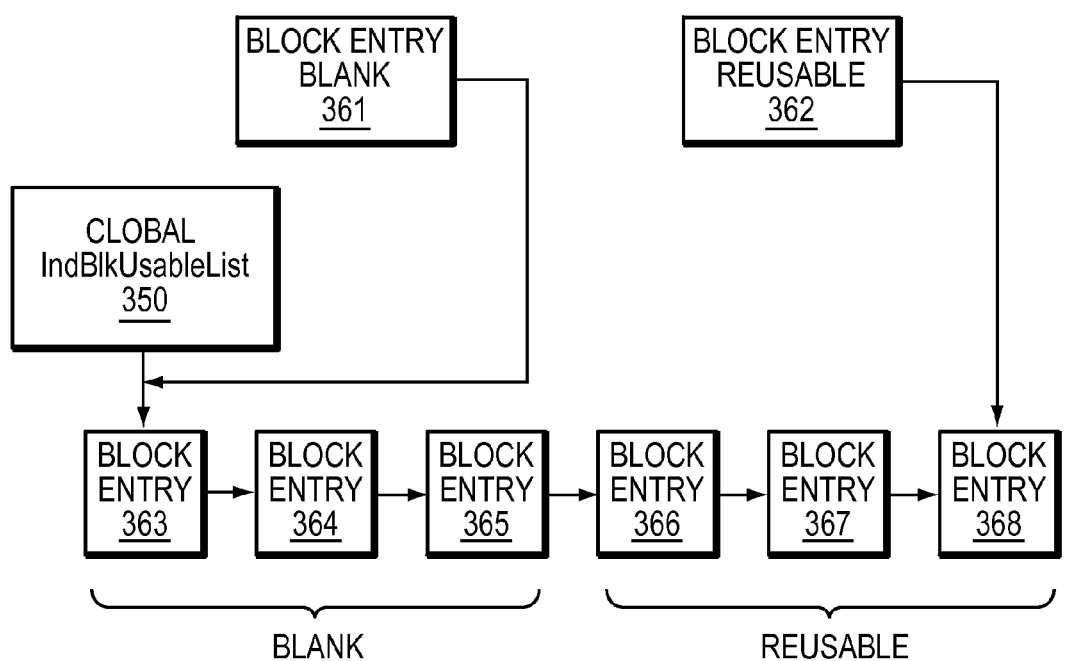

Referring to FIG. 11, shown is a more detailed representation of class "IndBlkUsableList" 350 that may be included in an embodiment using the techniques described herein. An instance of class "IndBlkEntry" 353 is created using a method (e.g. "grow") that adds the instance of an indirect block entry to a global reusable list represented by an instance of class "IndBlkUsableList" 350 in a least recently used manner. The total number of indirect block entries that may be added to the global reusable list 350 is based on an amount of memory available in file server 23. A single instance of class "IndBlkUsableList" 350 is created when file server 23 initializes during startup which represents a global reusable list. A predefined number of indirect block entries are added to the instance of "IndBlkUsableList" 350 during initialization of file server 23. A number of indirect block entries added during initialization of file server 23 are referred to as blank indirect block entries 361, 363-365. A blank indirect block entry is an indirect block entry that has not been provided to a user as a free indirect block entry yet and resides at the front of the global reusable list 350. Further, once an indirect block entry is provided to a user or client for storing metadata of a file system by removing the indirect block entry from the front of the global reusable list 350, the indirect block entry is considered as being in use by the user. An indirect block entry is added back to the global reusable list 350 as either a reusable or blank indirect block entry when a user finishes using the indirect block entry. If an indirect block entry is added back to the global reusable list 350 as a blank indirect block entry 361 indicating that the indirect block entry may be recycled as a free indirect block entry, the indirect block entry is added at the front of the global reusable list 350. If an indirect block entry is added back to the global reusable list 350 as a reusable indirect block entry 362 indicating that the indirect block entry may be reclaimed at a later time by a user, the indirect block entry is added at the end of the global reusable list 350. Thus, indirect block entries are removed from the front of the global reusable list 350 when a user requests a new indirect block buffer cache entry thereby consuming all blank indirect block entries before a reusable indirect block entry is recycled as a free indirect block entry.

Figure 12:
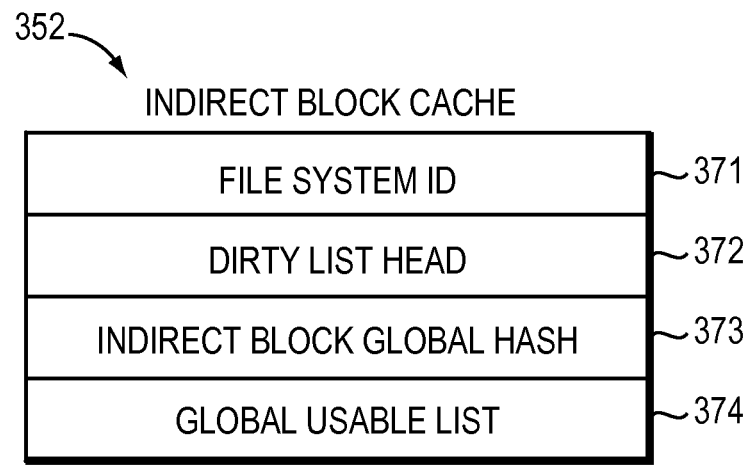

Referring to FIG. 12, shown is a more detailed representation of class "IndBlkCache" 352 that may be included in an embodiment using the techniques described herein. Class "IndBlkCache" 352 represents an indirect block cache associated with a file system such that the indirect block cache for the file system refers to a global metadata cache that stores metadata such as indirect block entries for a plurality of different file systems of file server 23. Further, indirect block cache 352 of a file system includes a file system identifier (also referred to as "fsid") 371 that identifies the file system, a dirty list head 372 that refers to a dirty list for the file system identified by the file system ID 371, an indirect block global hash 373 that points to the global metadata cache represented by an instance of class "IndBlkHash" 354, and global usable list 374 that refers to a global reusable list represented by an instance of class IndBlkUsableList" 350.

Figure 13:
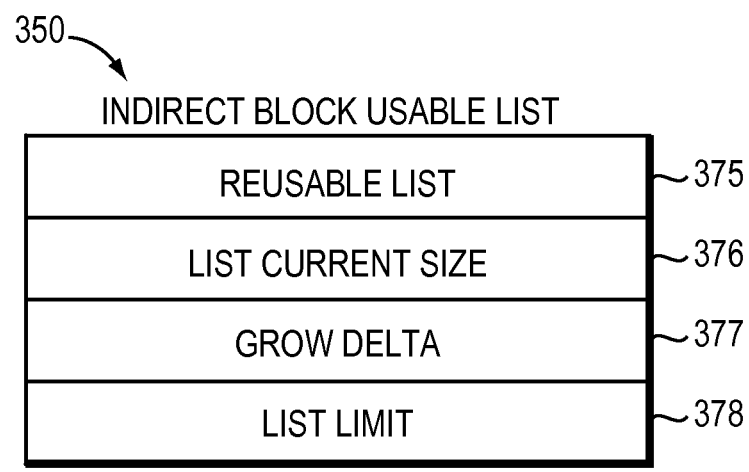

Referring to FIG. 13, shown is a more detailed representation of class "IndBlkUsableList" 350 that may be included in an embodiment using the techniques described herein. In at least one embodiment of the current technique, class "IndBlkUsableList" 350 represents a global reusable list of indirect block entries. The global reusable list 350 of indirect block entries includes a reusable list 375 that may be implemented as a queue in a least recently used manner, a list current size 376 indicating the number of indirect block entries included in the reusable list 375 at any given time, a grow delta 377 indicating a number of indirect block entries that may be added to the reusable list 375 when the reusable list 375 expands to add additional indirect block entries, and list limit 378 (also referred to as "global limit") indicating the maximum number of indirect block entries that may be included in the reusable list 375.

Figure 14:
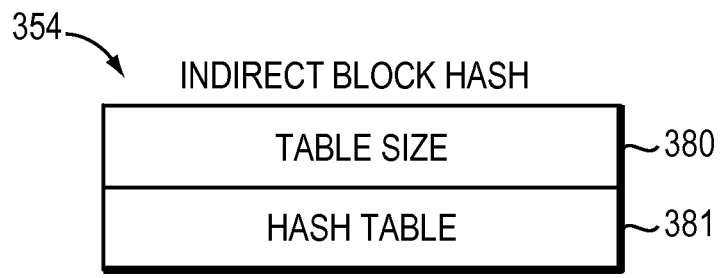

Referring to FIG. 14, shown is a more detailed representation of class "IndBlkHash" 354 that may be included in an embodiment using the techniques described herein. Class "IndBlkHash" 354 represents a global metadata cache for storing metadata such as indirect block entries that may be implemented as a hash table. The global metadata cache 354 includes a table size 380 indicating a size of a hash table that stores metadata, and the hash table 381. A request from a user to access an indirect block cache entry of a file of a file system attempts to find the indirect block cache entry in the hash table 381. Further, a lock is acquired when accessing an indirect block entry from the hash table 381. Thus, a number of buckets included in the hash table 381 must be large enough to avoid a lock contention that may block a request of accessing an indirect block cache entry. At the same time, the number of buckets included in the hash table 381 must be small enough in order to ensure a manageable number of indirect block entries in each bucket of the hash table 381. An instance of class "IndBlkHash" 354 is initialized when file server 23 starts up. Further, the instance of class "IndBlkHash" 354 is not destroyed during the time file server 23 is operational.

Figure 15:
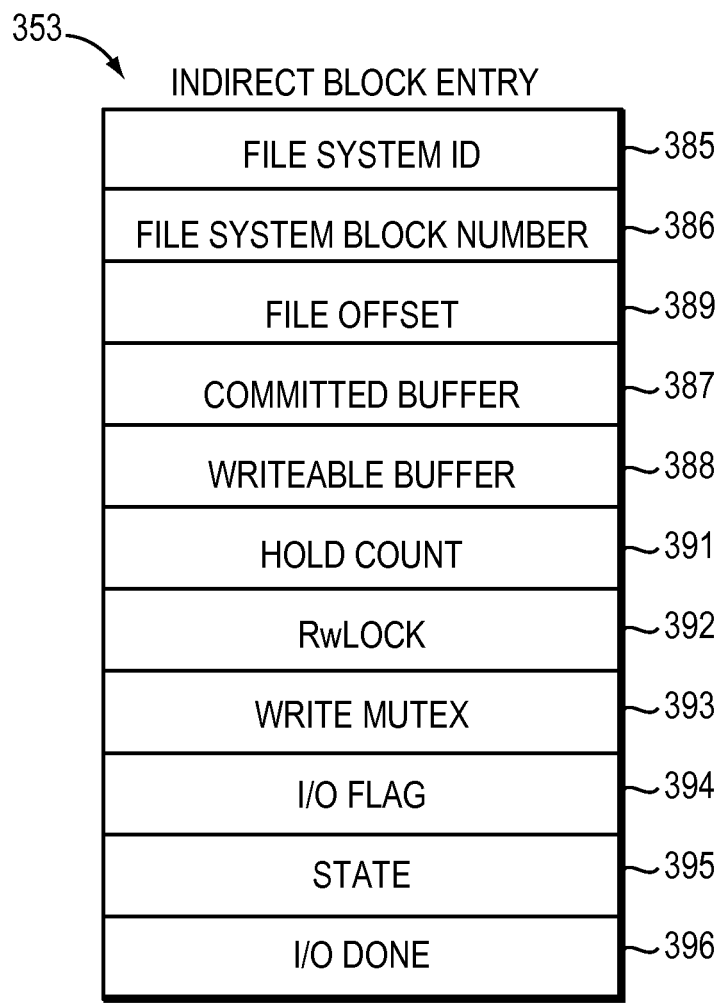

Referring to FIG. 15, shown is a more detailed representation of class "IndBlkEntry" 353 that may be included in an embodiment using the techniques described herein. An instance of class "IndBlkEntry" 353 represents an indirect block entry. An indirect block entry of an inode of a file of a file system includes file system identification 385 that identifies the file system, and a file system block number 386 that stores contents of the indirect block entry. Further, each indirect block entry is uniquely identified by file system ID 385 and file system block number 386. Additionally, an indirect block is associated with a range of logical block numbers (LBNs) such that a user accessing contents of the indirect block may use a logical block number either based on the value of the logical block number provided by the user or the value calculated based on an offset in order to access contents stored at the logical block number. A indirect block entry also includes file offset 389 that indicates the first offset of the data block included in the indirect block and information regarding level of indirection. A file system generation count is initialized and associated with an indirect block entry when the indirect block entry is allocated to a file system. A file system generation count is used for determining validity of contents of an indirect block entry when a file system associated with the indirect block entry is remounted. An invalid file system generation count indicates that contents of the indirect block are no longer valid and may need to be updated by reading information from a persistent storage. A logical block number for an indirect block entry is initialized when the indirect block entry is added to the global metadata cache 354. An instance of class "IndBlkEntry" 353 is created using a method (e.g. "grow") of class "IndBlkUsableList" 350 that adds the instance of the indirect block entry to the global reusable list 350. An instance of an indirect block entry created using the method (e.g., "grow") is added as a blank indirect block entry. Further, an indirect block entry includes a read-write lock 392 and a write mutex lock 393. The read-write lock 392 is used for accessing an indirect block entry and may be a shared lock or an exclusive lock. The read-write lock 392 is an access lock and is acquired when a user attempts to find an indirect block entry in the global metadata cache 354. A shared lock indicates that an indirect block entry is provided to a user in a shared mode and one or more users may read contents of the indirect block entry. An exclusive lock indicates that an indirect block entry is provided to a user in an exclusive mode and only one user may read contents of the indirect block entry. The read-write lock 392 is acquired when a user attempts to find an indirect block entry in the global metadata cache 354. Further, the read-write lock 392 released when an indirect block entry is returned to the global metadata cache 350 by a user. The write mutex lock 393 is acquired when a user writes to an indirect block entry. Further, the write mutex lock 393 is held by a user until the indirect block entry is added to a dirty list of a file system by the user. Further, an indirect block entry is associated with an indirect block buffer cache such that a reference to the indirect block buffer cache may be a "committed" or "writeable" reference. The committed buffer reference 387 for an indirect block buffer cache indicates that the indirect block buffer cache has at least been written to a file system transaction log. The committed buffer reference 387 for an indirect block buffer cache is a read-only reference indicating that one or more users may read contents of the indirect block buffer cache. A writeable buffer reference 388 for an indirect block entry may be created using any one of the following two mechanisms. A writeable reference for an indirect block entry is created when a copy of committed buffer reference 387 is created and provided to a user such that the user uses the writeable reference of the indirect block buffer cache entry for updating contents of the indirect block entry. However, only one buffer cache block may exists as a writeable copy at any given time. Alternatively, a writeable reference for an indirect block entry is created when a method (e.g., "enterInToCache") of class "IndBlkCache" 352 is invoked. In such a case, the method creates a new buffer cache block for the indirect block entry and adds the indirect block entry associated with the new buffer cache block to the global metadata cache 354 as the writeable reference. In such a case, the global metadata cache 354 assumes ownership of the writeable reference. Further, a writeable reference for an indirect block entry may convert into a committed reference when the indirect block entry is added to a dirty list. In such a case, a committed reference associated with the indirect block entry is replaced by the writeable reference as a new committed reference. Further, in such a case, the old committed reference is released. An indirect block entry includes a hold count in order to manage access to the indirect block entry. Similarly, a buffer cache block (e.g., committed, writeable) of an indirect block entry also includes a hold count in order to manage access to the buffer cache block via the indirect block entry. The hold count value of an indirect block entry is incremented indicating that a hold is placed on the indirect block entry, when a method is invoked to find the indirect block entry in the global metadata cache. Further, if the indirect block entry is added to a dirty list, the hold count is incremented again. The hold placed on an indirect block entry by using the hold count avoids the indirect block entry to be reused by another user. If the hold count of an indirect block entry is at least one, the hold count of the committed buffer cache block of the indirect block entry is also at least one such that the indirect block entry may not be recycled. If a user issues a request to get a readable buffer cache block associated with an indirect block entry, a reference is added to the committed buffer cache block of the indirect block entry by incrementing the hold count of the committed buffer cache block such that the user must release the hold on the committed buffer cache block once the user finish using the readable buffer. Further, in such a case, the user must release the reference to the indirect block entry as well by decrementing the hold count of the indirect block entry. If the hold count of an indirect block entry becomes zero, the indirect block entry transitions to a reusable state indicating that the indirect block entry may be reused by another user. Further, in such a case, the hold count on the committed buffer cache block of the indirect block entry also becomes zero. If an indirect block entry associated with an indirect block of a file system transitions to a reusable state and subsequently reused to store contents of the same indirect block of the file system, the committed buffer cache block associated with the indirect block entry may be reused by another user by the time the indirect block entry is reused. Thus, in such a case, a hint is used in order to determine whether the committed buffer cache block of the indirect block entry is valid at the time the indirect block entry is reused. Further, indirect block entry 353 includes I/O flag 394 indicating status of an I/O operation, state 395 indicating state (e.g., "inuse", "reusable", "blank", "initializing", recycling") of the indirect block entry 353, and I/O done 396 indicating a condition variable that manages synchronization between multiple users that are waiting to access contents of the indirect block entry 353.

In at least one embodiment of the current technique, locks (e.g., read-write lock 392 and write mutex lock 393), and references (e.g., writeable reference 388, committed reference 387) for an indirect block enables multiple readers to access a committed reference of the indirect block by acquiring an access lock in a shared mode while a single writer has access to a copy of the committed reference in a write mode. Thus, a type of access lock acquired for an indirect block entry determines what type of action (e.g., reading, writing) a client may take on a writeable reference associated with the indirect block entry. An access lock for an indirect block acquired in a shared mode entry indicates that existing block pointers included in the indirect block may not be modified but new block pointers may be added to the indirect block, and metadata (e.g., weight field) of the existing block pointers may be updated. An access lock for an indirect block acquired in a shared mode ensures that users that may have read-only references of the indirect block may replace the read-only references with an updated writeable reference when the indirect block is added to a dirty list of a file system. Similarly, an access lock for an indirect block entry acquired in an exclusive mode indicates that a client may make any changes to the indirect block, including but not limited to updating existing block pointers of the indirect block entry. An access lock for an indirect block entry acquired in an exclusive mode ensures that there are no stale committed references in use by users.

Figure 16:
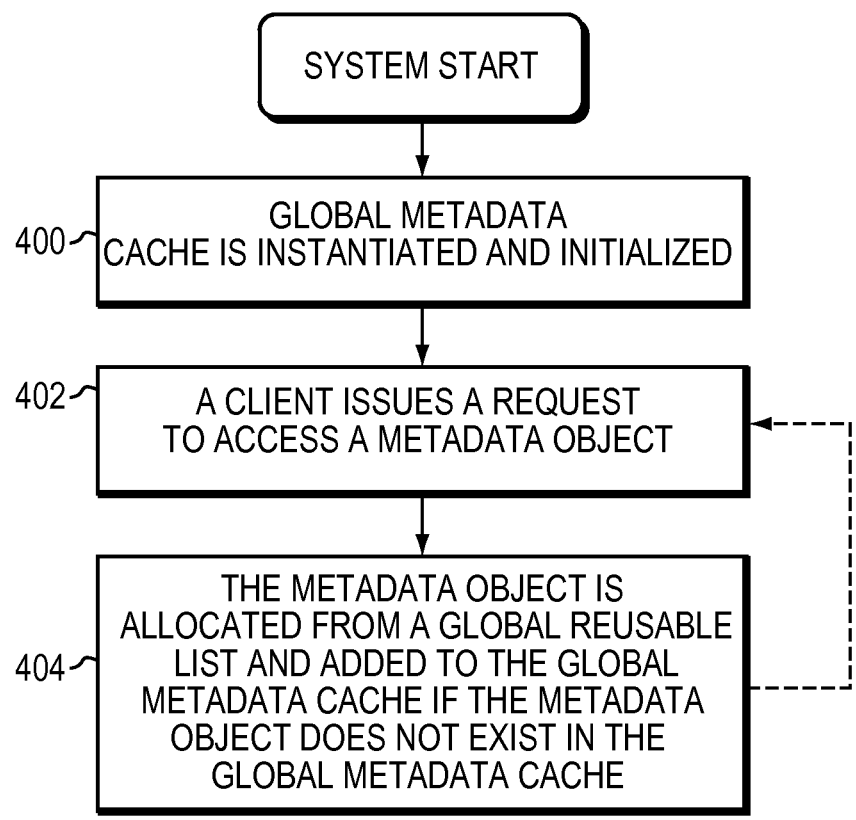
FIG. 16 is a flow diagram illustrating processes that may be used in connection with techniques herein.

Referring to FIG. 16, shown is a flow diagram illustrating a flow of data in the data storage system. With reference also to FIG. 10, global metadata cache 354 is instantiated and initialized before a first file system is mounted when file server 23 boots up (step 400). A client issues a request to access metadata (such as indirect block) of a file system (step 402). If the metadata (such as indirect block) requested by the client is not found in the global metadata cache 354, an entry is allocated from global reusable list 350, contents of the metadata are read from a persistent storage, and the metadata is stored in the global metadata cache 354 (step 404). A reference to the metadata is provided to the client. Further, the client indicates an access lock (e.g., shared mode, exclusive mode) when accessing metadata. Once a reference to metadata is acquired, the client indicates the type of access (e.g., read-only or writable).

Figure 17:
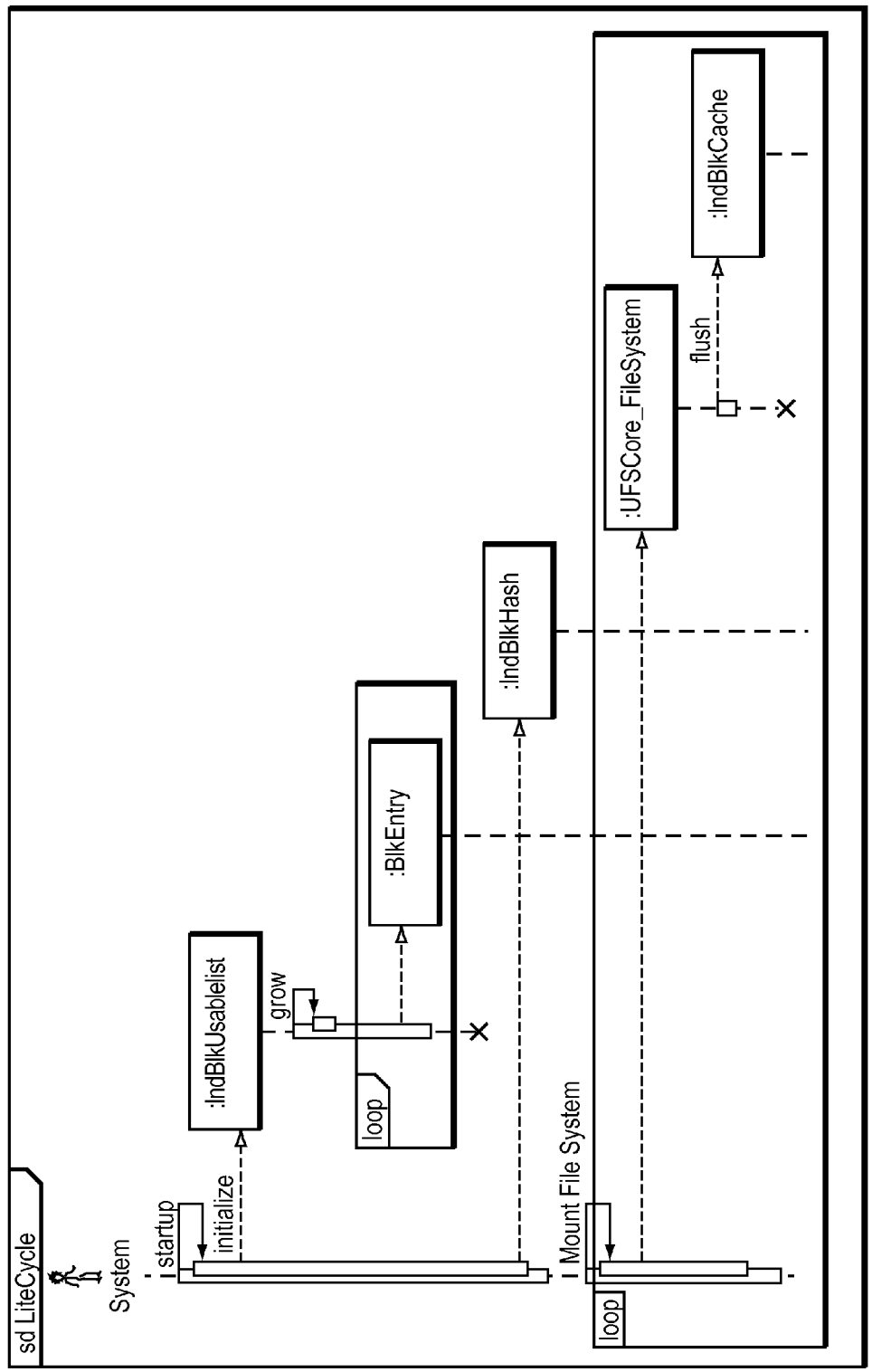
FIGS. 17-18 are sequence diagrams illustrating processes that may be used in connection with techniques herein.

FIG. 17 illustrates an example of a sequence for a start up of a data storage system. With reference also to FIGS. 10 and 16, an instance of class "IndBlkUsableList" 350 indicating a global reusable list is created and initialized during startup of file server 23. A number of instances of class "IndBlkEntry" 353 are added to the instance of class "IndBlkUsableList" 350. A client interacts with a per-file system instance of class "IndBlkCache" 352 for accessing an indirect block buffer cache entry stored in the global metadata cache such that the indirect block buffer entry is accessed using a reference.

Figure 18:
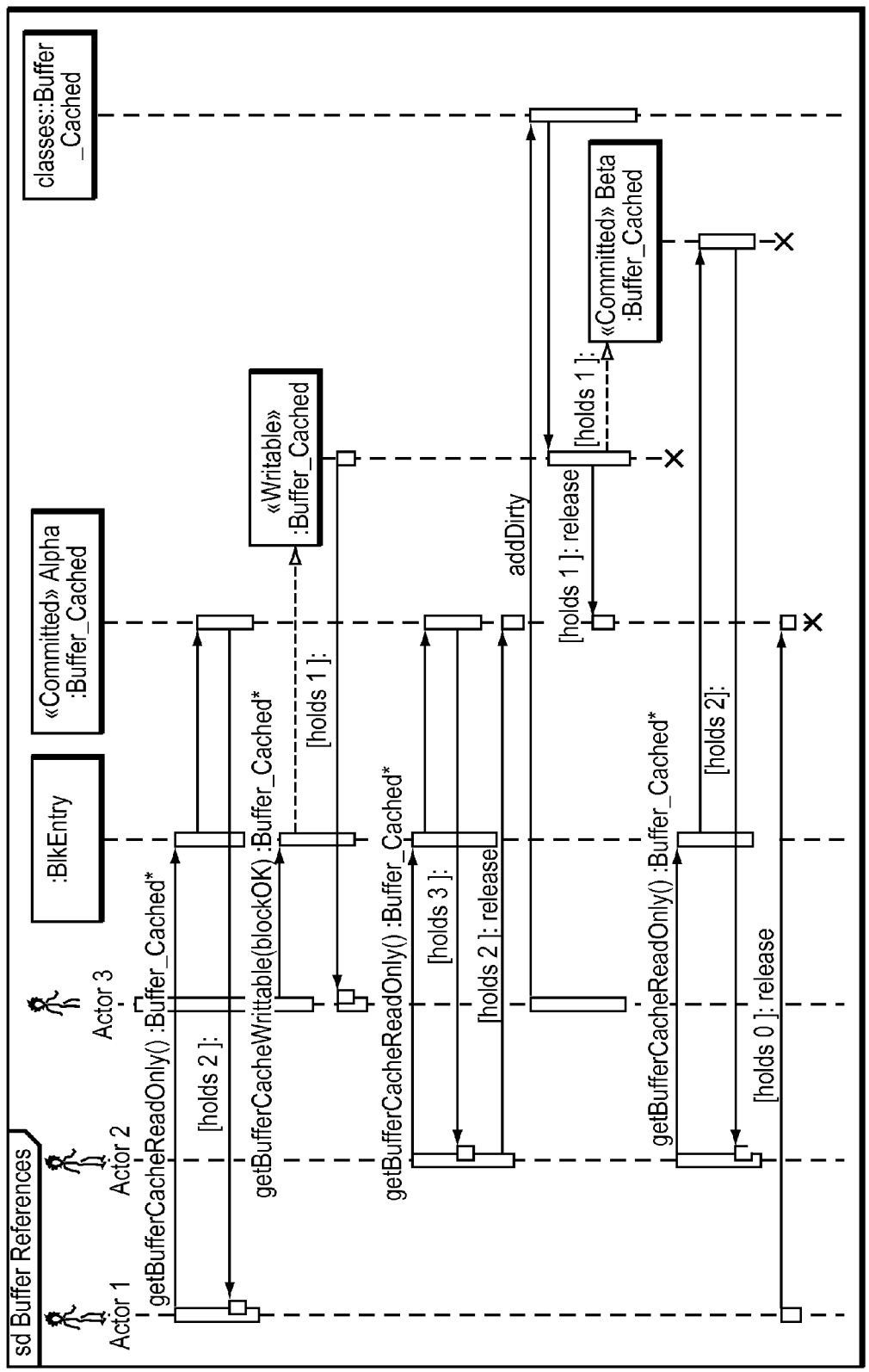

FIG. 18 illustrates an example of a sequence of multiple clients accessing metadata included in a global metadata cache of a data storage system. With reference also to FIGS. 10 and 16, for example, users such as actor1, actor2 and actor3 have acquired an access lock in a shared mode for an indirect block entry of a file system. A committed reference for the indirect block entry is indicated by a committed buffer cache named "Alpha" in the sequence diagram illustrated in FIG. 18 such that the committed buffer cache includes a hold count that has value equal to 1. For example, in the example sequence as shown in FIG. 18, actor1 issues a request for retrieving a read only buffer. The committed buffer cache "Alpha" is provided to actor1 after incrementing the hold count (value is equal to 2 now). Then, actor3 sends a request to access a writeable buffer cache block. The writable buffer cache block is created as a copy of the committed buffer "Alpha" with value of reference as 1. Then, actor2 sends a request for retrieving a read only buffer. The committed buffer cache "Alpha" is provided to actor2 after incrementing the hold count (value is equal to 3 now). Next, actor2 releases the read only buffer and the hold count is decremented (value is equal to 2 now). Then, actor3 invokes a method (e.g., "addDirty") that adds the indirect block entry to a dirty list for the file system. As a result, the global metadata cache 354 releases a reference to the committed buffer cache block "Alpha" by decrementing the hold count (value is equal to 1 now) and replaces the committed buffer cache block reference with a writeable buffer cache block reference, which becomes the new committed buffer cache block reference referred to as "Beta" in FIG. 18. The writeable reference for the indirect block is updated to a NULL value. The committed buffer cache block "Alpha" can not be reclaimed and returned to the global metadata cache 354 yet because even though global metadata cache 354 has released a hold on the committed buffer cache block "Alpha", actor1 still includes a hold on the committed buffer cache block "Alpha". Next, actor2 sends a request for retrieving a read only buffer. A reference to the new committed buffer cache block "Beta" is provided to actor2 by incrementing the hold count (value is equal to 2 now). Finally, actor1 release a reference to the committed buffer cache block "Alpha" by decrementing the hold count (value is equal to 0 now) enabling the global metadata cache 354 to reclaim the buffer cache block for reusing the buffer cache block as a free entry.

Figure 19:
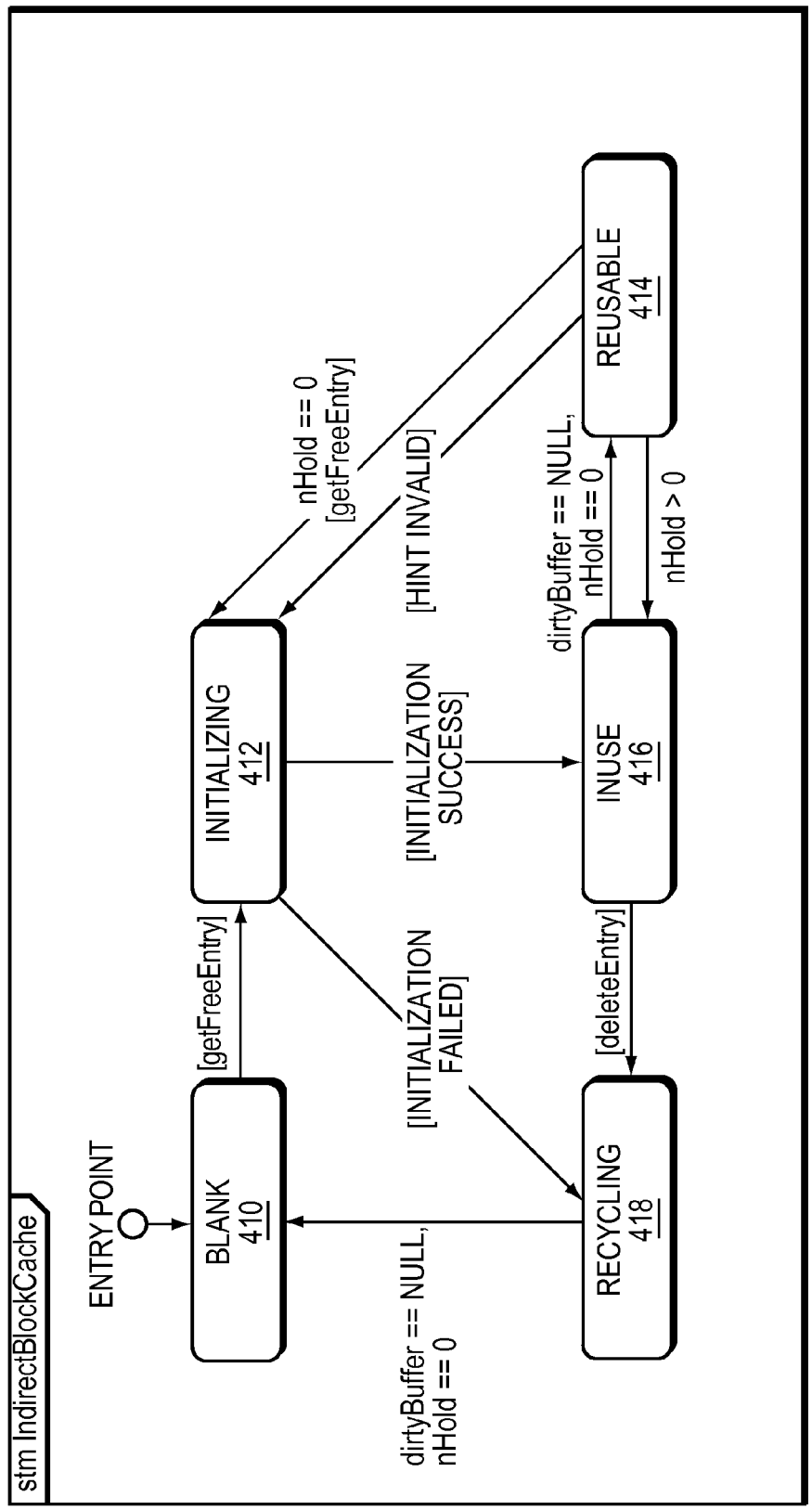
FIG. 19 is a state diagram illustrating processes that may be used in connection with techniques herein.

FIG. 19 illustrates an example of a state diagram of an indirect block entry of a file system of a data storage system. During initialization of file server 23, a new instance of class "IndBlkEntry" 353 is created using a method (e.g., "grow") of class "IndBlkUsableList" 350. A newly created instance of class "IndBlkEntry" 353 indicates a free indirect block entry that may be used for caching metadata in global metadata cache 354. An instance of class "IndBlkEntry"353 is created as a blank indirect block entry such that state 395 of the indirect block entry is set to "blank" 410. Further, once an instance of class "IndBlkEntry" 353 is created, the instance is not deleted, but reused one or more times. An instance of class "IndBlkEntry" 353 transitions from one state to another state as the instance (also referred to herein as "indirect block entry") is used by a user. The state of an indirect block entry is indicated by state field 395 included in class "IndBlkEntry" 353. State "blank" 410 indicates that an indirect block entry is not associated with a buffer cache block, resides on the global reusable list 350, and does not exist in the global metadata cache 354 represented as hash table using an instance of class "IndBlkHash". Further, an indirect block entry that includes state "blank" 410 transitions to state "initializing" 412 when a function (e.g., "getFreeEntry") is invoked that removes the indirect block entry from the global reusable list 350. State "initializing" 412 is an intermediate state that is assigned to an indirect block entry when the indirect block entry is initialized such that a user may access the indirect block entry. Further, an indirect block entry that includes state "initializing" 412 transitions to state "inuse" 416 when the indirect block is successfully initialized. Thus, state "inuse" 416 for an indirect block entry indicates that the indirect block entry is currently being used by a user, and an additional user may be waiting to access the indirect block entry. Further, state "inuse" 416 for an indirect block entry indicates that the indirect block entry is included in the global metadata cache 354 and has been removed from the global reusable list 350. State "reusable" 414 for an indirect block entry indicates that the hold count of the indirect block entry is zero indicating that no references exists for the indirect block, and the indirect block entry does not reside on a dirty list of a file system. Further, state "reusable" 414 for an indirect block entry indicates that the indirect block entry resides in the global metadata cache 354 and the global reusable list 350. Further, state "recycling" 418 for an indirect block is an intermediate state that is set when the indirect block is either deleted or fails to initialize.

Figure 20:
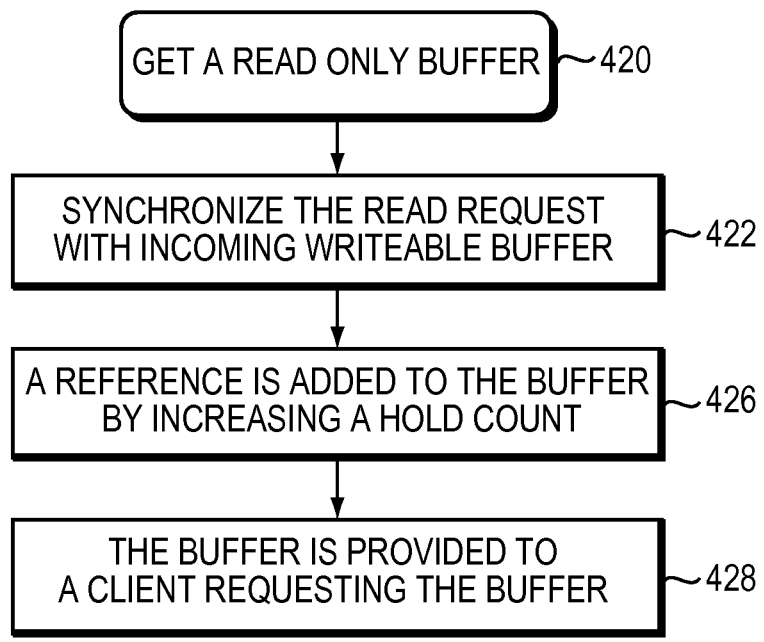
FIGS. 20-27 are flow diagrams illustrating processes that may be used in connection with techniques herein.

Referring to FIG. 20, shown is a flow diagram illustrating a flow of data in the data storage system. With reference also to FIG. 10, a user may send a request to retrieve a read-only reference to a buffer cache block associated with an indirect block entry (step 420). Further, a synchronization may be required between a committed buffer and a writeable buffer when the writeable buffer is converted to the committed buffer during the time the user attempts to retrieve the read-only reference to the indirect block entry (step 422). A read-only reference to the committed buffer associated with the indirect block entry is provided to the user after incrementing the hold count of the committed buffer (step 426, 428). Further, the user must release the reference acquired for the committed buffer in addition to releasing a reference to the indirect block entry when the user no longer needs to access the indirect block entry.

Figure 21:
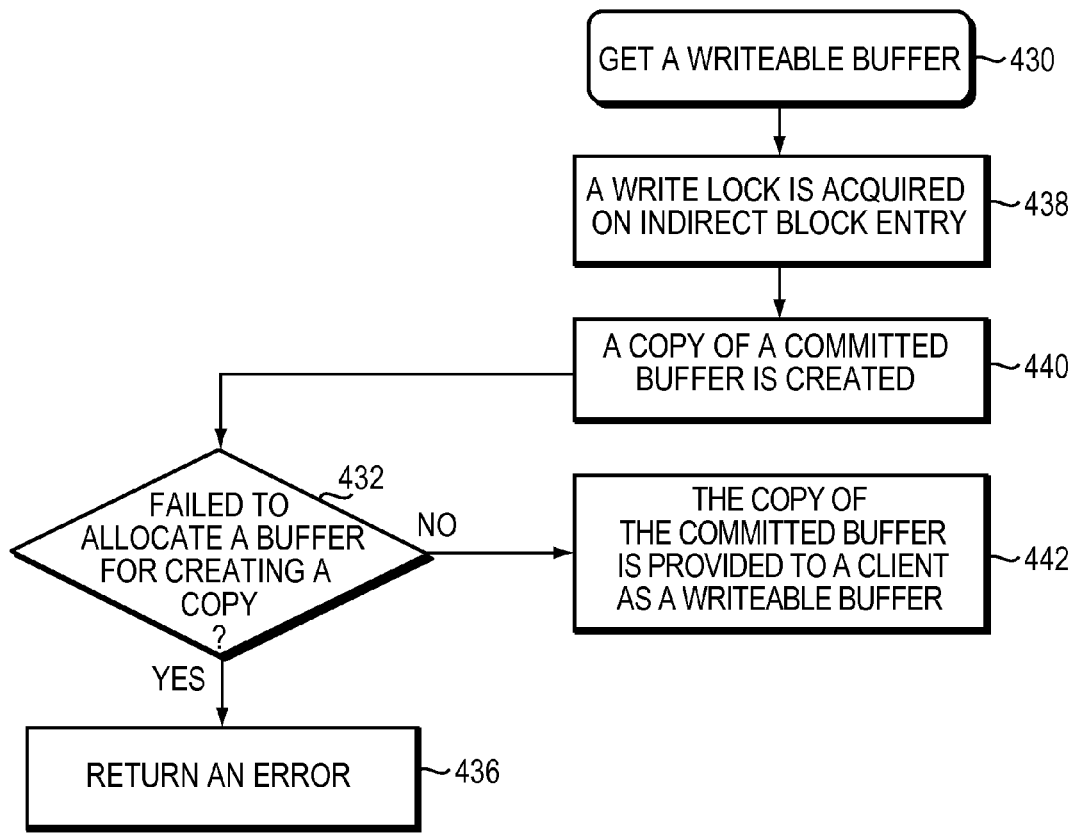

Referring to FIG. 21, shown is a flow diagram illustrating a flow of data in the data storage system. With reference also to FIG. 10, a user may send a request to retrieve a writeable reference to a buffer cache block associated with an indirect block entry (step 430). A mutex lock 393 on the indirect block entry is acquired (step 438). A copy of a committed buffer (also referred to as "committed buffer cache block") associated with the indirect block entry is created (step 440). The copy of the committed buffer cache block is provided to the user as a writeable reference such that the user may update the writeable buffer associated with the writeable reference (step 442). The mutex lock 393 is not released until the writeable buffer is added to a dirty list of a file system. As a result, the mutex lock 393 ensures that only one copy of the committed buffer cache block is provided to a client as a writeable reference at any given time. Further, unlike the request to retrieve a read-only reference, the user must not release the writeable reference acquired for the committed buffer cache block. Once the writeable buffer is added to the dirty list, the user may not be able to use the writeable reference for writing to the committed buffer cache block. In such a case, if the user need to reuse the committed buffer cache block, the user may issue another request to retrieve a writeable reference to the committed buffer cache block. If file server 23 fails to allocate a new buffer cache block for creating a copy of the committed buffer, an error is returned back to the user (step 436).

Figure 22:
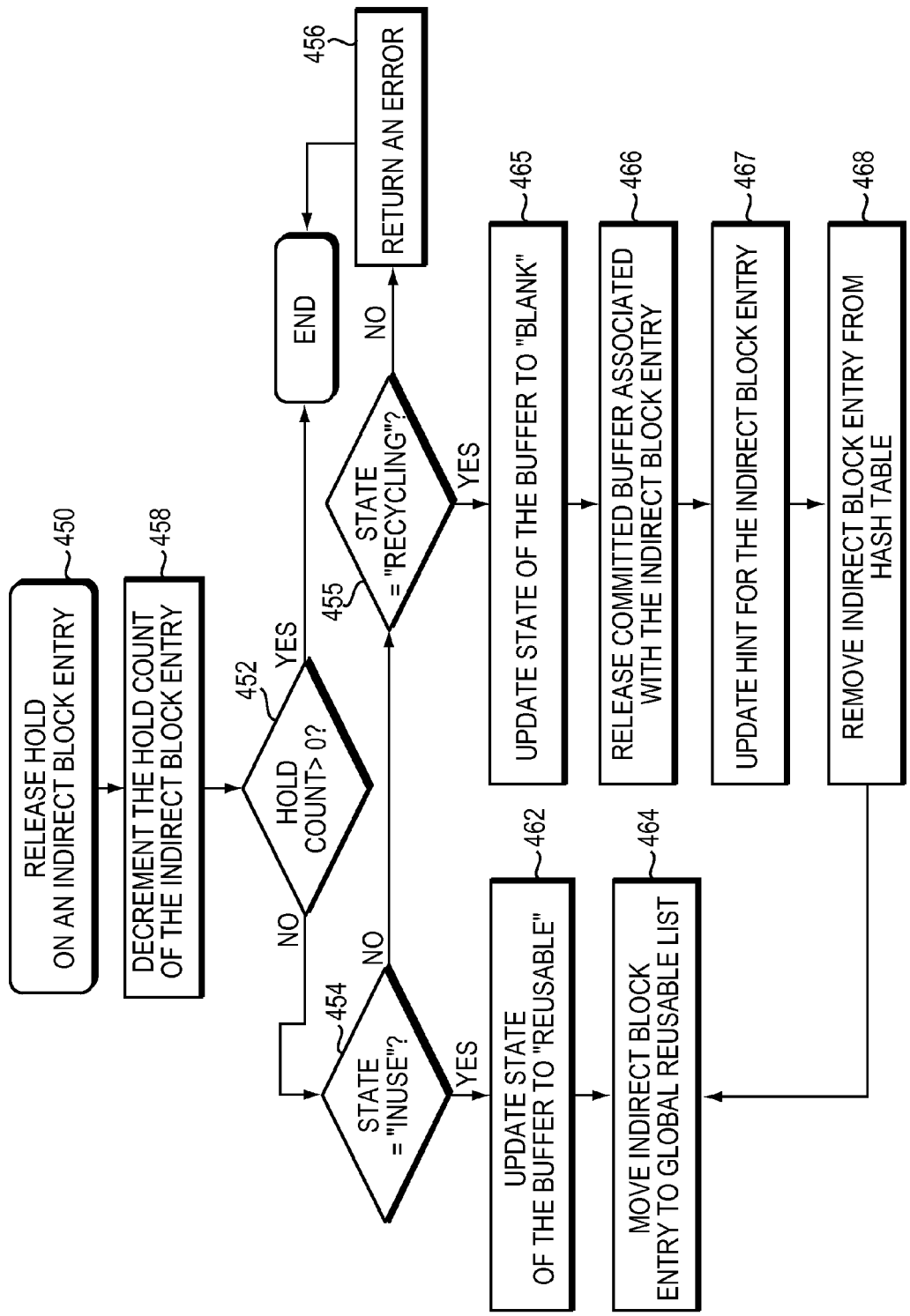

Referring to FIG. 22, shown is a flow diagram illustrating a flow of data in the data storage system. With reference also to FIG. 10, a user may send a request to release a reference (also referred to as "hold") to an indirect block entry (step 450). The hold count of the indirect block entry is decremented (step 458). The updated hold count is evaluated (step 452). If the value of the updated hold count is greater than zero, the processing ends. If the value of the updated hold count is equal to zero, the state of the indirect block entry is evaluated. If the state of the indirect block is set to state "inuse" 416 (step 454), the indirect block entry transitions to state "reusable" 414 by updating the state 395 of the indirect block entry to "reusable" (step 462). However, if the state of the indirect block is set to state "recycling" 418 (step 455), the state is updated to state "blank" 410 (step 465). In such a case, a committed buffer associated with the indirect block entry is released (step 466). A hint value of the indirect block entry is updated (step 467). The indirect block entry is removed from the hash table of global metadata cache 354 (step 468). At the end, the indirect block entry is added to the global reusable list 350 (step 464). Further, the user may not be able to use the indirect block entry again once the indirect block entry has been released by the user, unless the user sends a request to reacquire the indirect block entry from the global reusable list 350. However, the indirect block entry may only be reacquired if a valid hint exists for the indirect block entry. However, when an indirect block entry is found in the global metadata case but the hint for the indirect block entry is invalid, the value of a flag "allow blocking" is determined. If the flag is set, contents of the indirect block entry are read from a persistent storage and stored in a new committed buffer such that the hint refers to the new committed buffer. If the flag is not set, an error is returned indicating that a valid indirect block entry does not exists in the global metadata cache.

Figure 23:
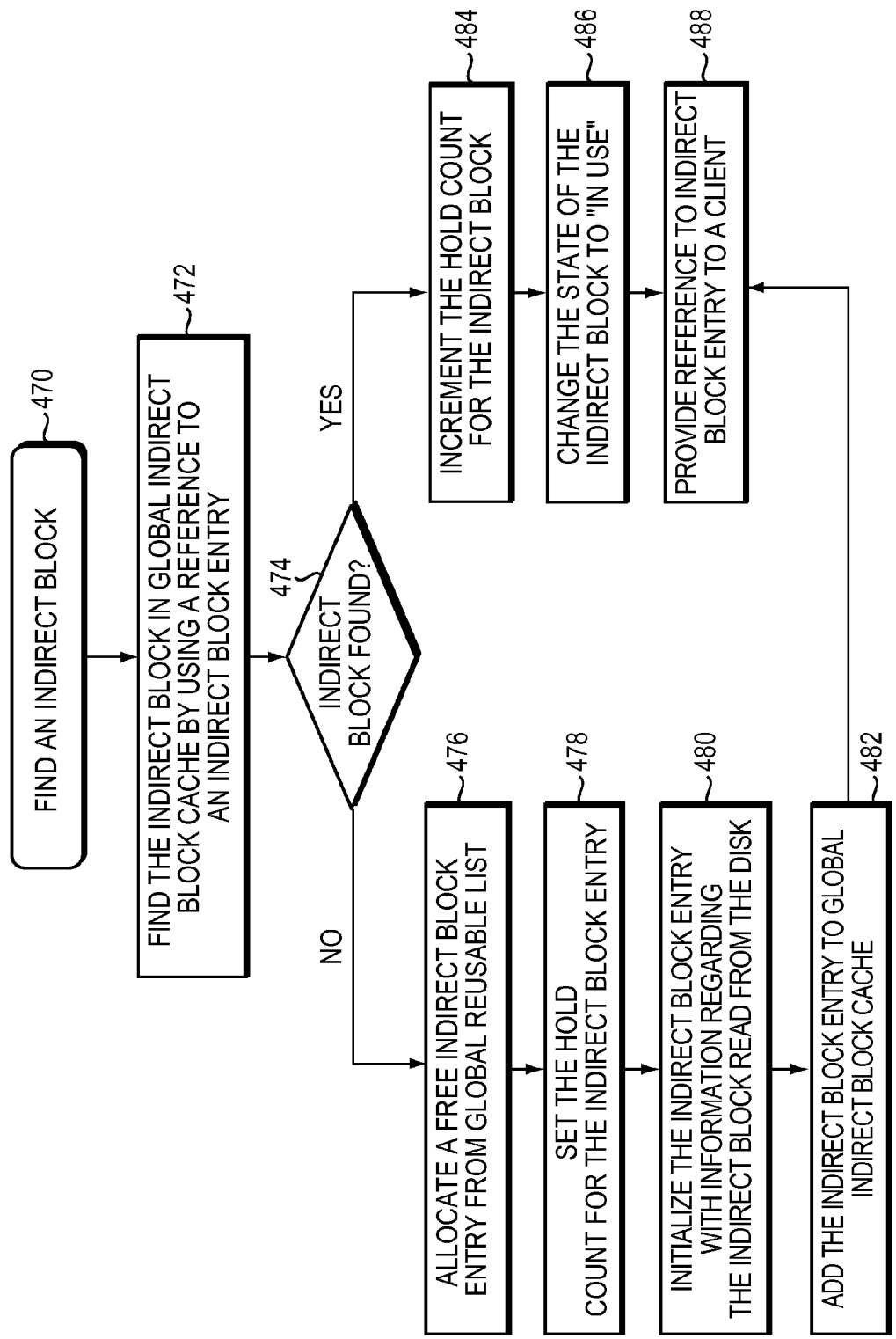

Referring to FIG. 23, shown is a flow diagram illustrating a flow of data in the data storage system. With reference also to FIG. 10, a user may send a request to find an indirect block entry in the global metadata cache 354 (step 470). In at least one embodiment of the current technique, an indirect block cache represented by an instance of class "IndBlkCache" 352 is associated to a file system represented by an instance of class "UFSCore FileSystem" 351. Further, users of the file system access the indirect block cache using the instance of class "UFSCore FileSystem" 351 in order to access indirect block entries stored in the global metadata cache 354. Each file system of file server 23 includes a single instance of class "IndBlkCache" 352 which is initialized with information such as a reference to the file system, reference to the global metadata cache 354 represented by an instance of class "IndBlkHash", and reference to the global reusable list represented by an instance of class "IndBlkUsableList" 350. A user of a file system accesses an indirect block entry using an instance of class "IndBlkEntry" 353. The user uses the instance of the indirect block entry to access a buffer cache block associated with the indirect block entry in order to access contents of the indirect block entry. An instance of an indirect block entry is not deleted but recycled. Further, an indirect block cache for a file system includes a mechanism to create a placeholder entry that is used in a case where the physical disk address of an indirect block entry is not available but may be computed using a file system block number at a later time. In such a case, an instance of class "IndBlkEntry" 353 is used to manage a placeholder entry. However, the instance that is used to manage a placeholder entry functions differently from a typical indirect block entry instance.

When a user fails to find an indirect block entry in the global metadata cache 354, an instance of class "IndBlkEntry" 353 is created and added to the global metadata cache 354. if an instance of an indirect block entry represents a place holder entry, a buffer cache block is not read from a persistent storage. Further, if an instance of an indirect block entry represents a place holder entry, a committed buffer reference 387 and writeable buffer reference 388 are set to NULL value. Further, if an instance of an indirect block entry represents a placeholder entry, the instance of the indirect block entry is never added to a dirty list. However, an instance of an indirect block indicating a placeholder entry is locked using an access lock, released by a user, and ages similar to a typical indirect block entry.

In at least one embodiment of the current technique, a method to find an indirect block entry in the global metadata cache 354 provides a reference to the indirect block represented by an instance of class "IndBlkEntry" 353. The method provides an existing reference to the indirect block if the indirect block exists in the global metadata cache 354. However, if the indirect block does not reside in the global metadata cache 354, the method creates a new entry into the global metadata cache by reading contents of the indirect block from a persistent storage (e.g., disk) and provides a reference to the newly created entry to the user. Further, a reference to an indirect block entry is associated with an access lock (e.g., shared, exclusive). Thus, a reference to an indirect block entry is locked based on a type of access requested by a user after the reference to the indirect block entry is provided to the user. An access lock is not released until a user releases a reference to an indirect block entry. A user may either request a readable buffer as described herein in FIG. 20 or request a writeable buffer as described herein in FIG. 21 after the user is provided with a reference to an indirect block entry.

In at least one embodiment of the current technique, file server 23 upon receiving a request to find an indirect block attempts to find the indirect block in the global metadata cache 354 using a reference of the indirect block provided by the user (step 472). File server 23 searches a set of buckets included in a hash table represented by an instance of class "IndBlkHash" 354 based on a hash key. In at least one embodiment of the current technique, a hash key may be derived from a file system ID and file system block number of an indirect block entry. Further, a cache hit occurs if the indirect block entry is found in the global metadata cache (step 474). A file system generation count of the reference of the indirect block entry is compared with the value of the file system generation count of the indirect block entry found in the global metadata cache. If values of the file system generation counts do not match, the indirect block entry is considered an invalid indirect block entry. An invalid indirect block entry is either reused by reading up-to-date contents of the indirect block from a persistent storage or removed from the global metadata cache 354. If a valid indirect block entry is found in the global metadata cache 354, the hold count 391 of the indirect block entry is incremented (step 484). State 395 of the indirect block entry is updated to state "inuse" 416, if not already set to the state "inuse" 416 (step 486). A reference to the indirect block entry is provided to the user (step 488).

Further, a cache miss occurs if the indirect block entry is not found in the global metadata cache 354 (step 474). In such a case, if a set of users are requesting the same indirect block entry, the first user of the set of users that indicates a blocking request proceeds ahead and reads contents of the indirect block entry from a persistent storage and loads the indirect block entry into the global metadata cache 354. A first subset of the set of users indicating a blocking request waits until the indirect block entry is loaded into the global metadata cache before accessing the indirect block. A second subset of the set of users indicating a non-blocking request does not wait for the first user to load the indirect block entry, and are providing with an error message. A free indirect block entry is allocated from the global reusable list 350 in order to load the indirect block entry from a persistent storage into the global metadata cache (step 476). The hold count 391 of the newly allocated indirect block entry is updated (step 478). The newly allocated indirect block entry is initialized with contents of the indirect block entry read from the persistent storage (step 480). The newly allocated indirect block entry is added to the global metadata cache 354 (step 482). A reference to the indirect block entry is provided to the user (step 488). If a user specifies that a reference to an indirect block indicates a placeholder entry, which is identified by a unique file system ID and file system block number, a blank indirect block entry is allocated from the global reusable list 350 and a reference to the blank indirect block entry is provided to the user upon encountering a cache miss scenario. In the end, the reference to the indirect block entry provided to the user is locked in a shared or exclusive mode, the hold count of the indirect block entry is incremented, and the state of the indirect block entry transitions to state "inure".

Figure 24:
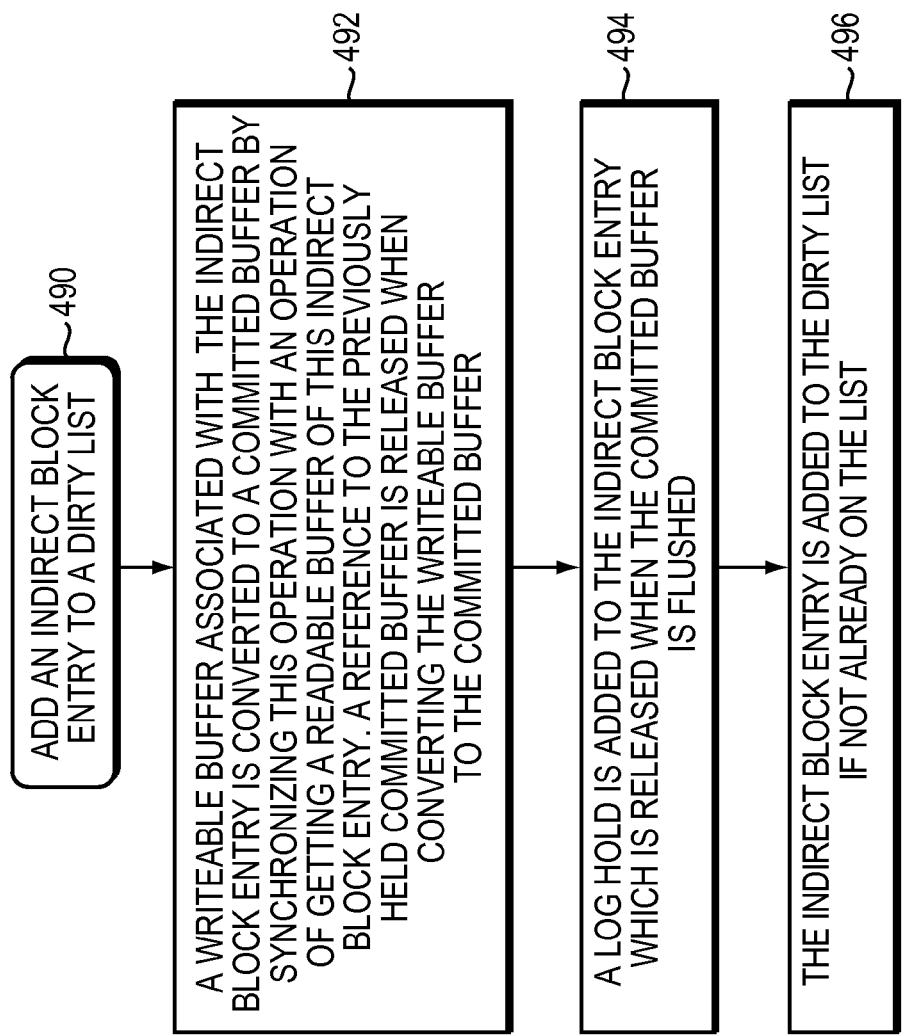

Referring to FIG. 24, shown is a flow diagram illustrating a flow of data in the data storage system. With reference also to FIG. 10, an indirect block entry is added to a dirty list of a file system (step 490). An indirect block entry is added to a dirty list of a file system when a writeable buffer associated with the indirect block entry is written to a file system transaction log associated with the file system. Further, metadata information stored in an indirect block entry of a dirty list is transferred (also referred to as "flushed") to a persistent storage either by a file sync operation at the time data and/or metadata of a file system is updated or at a later time when a number of indirect block entries in the dirty list exceeds a pre-determined threshold. In at least one embodiment of the current technique, a committed (also a read-only reference) buffer associated with an indirect block entry is updated to refer to a writeable buffer associated with the indirect block entry when the indirect block entry is added to the dirty list (step 492). Thus, a buffer cache referred to by the committed buffer before the committed buffer is updated to refer to the writeable buffer is released and the writable buffer becomes the new committed buffer. Further, the process of converting the writeable buffer reference to the committed buffer is synchronized with an operation of retrieving a read only buffer cache reference for the indirect block entry. A log hold is added to the indirect block entry which is released when the committed buffer associated with the indirect block entry is flushed to a persistent storage (494). The indirect block entry is then added to the dirty list if not present already on the dirty list. (496). At this time, a write lock on the indirect block entry is released thereby allowing users to retrieve a new writable reference for the indirect block entry. In at least one embodiment of the current technique, a synchronization process flushes an indirect block entry from a dirty list of a file system. Further, a number of synchronization processes may flush multiple indirect block entries concurrently.

Figure 25:
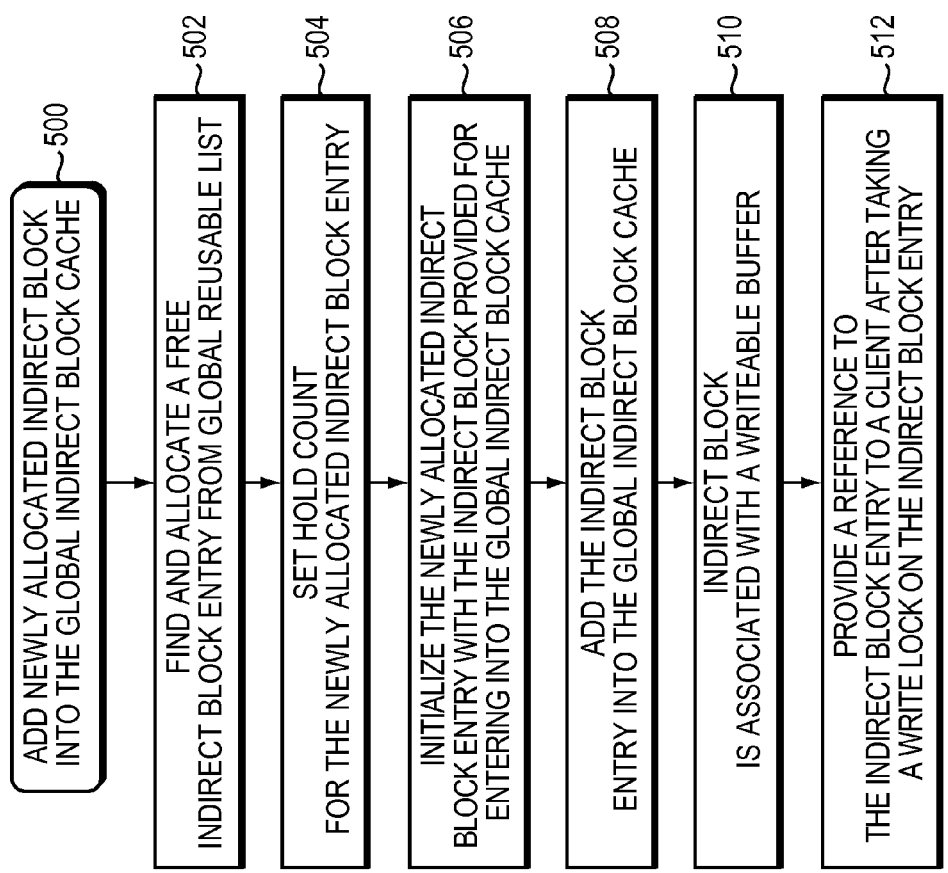

Referring to FIG. 25, shown is a flow diagram illustrating a flow of data in the data storage system. With reference also to FIG. 10, a newly allocated indirect block buffer cache is added to the global metadata cache 354 (step 500). If an indirect block entry for a corresponding file system block number of a file system does not exist in the global metadata cache 354, a free indirect block entry is allocated from the global reusable list 350 (step 502). The hold count 391 of the newly allocated indirect block entry is updated (504). Contents of the newly allocated indirect block entry are initialized with contents of the indirect block buffer cache that is being added to the global metadata cache 354 (step 506). The indirect block entry is added to the global metadata cache 354 (step 508). The indirect block buffer cache is associated with the indirect block entry as a writeable buffer reference for the indirect block entry (step 510). A reference to the indirect block entry is provided to a client after acquiring a write lock on the indirect block entry (step 512). Thus, in such a case, the global metadata cache 354 takes ownership of the reference associated with the indirect block buffer cache indicating that the client can not release the reference to the newly allocated buffer cache. Further, a committed (read-only) reference to the indirect block entry is not created until the indirect block entry has been added to a dirty list.

Figure 26:
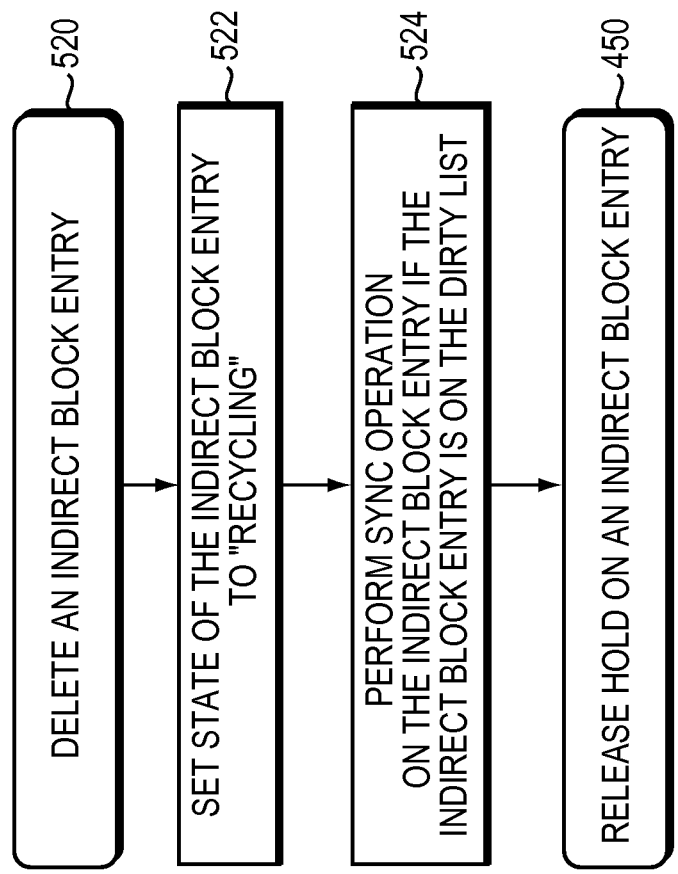

Referring to FIG. 26, shown is a flow diagram illustrating a flow of data in the data storage system. With reference also to FIG. 10, an indirect block entry is removed from the global metadata cache 354 (step 520). The state of the indirect block entry is updated to state "recycling" 418 (step 522). If the indirect block entry resides on a dirty list of a file system, a committed buffer associated with the indirect block entry is synchronized with the file system before the indirect block entry is removed from the global metadata cache 354 (step 524). A hold on the indirect block entry is released using a series of steps illustrated in FIG. 22 (step 450). Further, a buffer cache block associated with the indirect block entry is freed.

Figure 27:
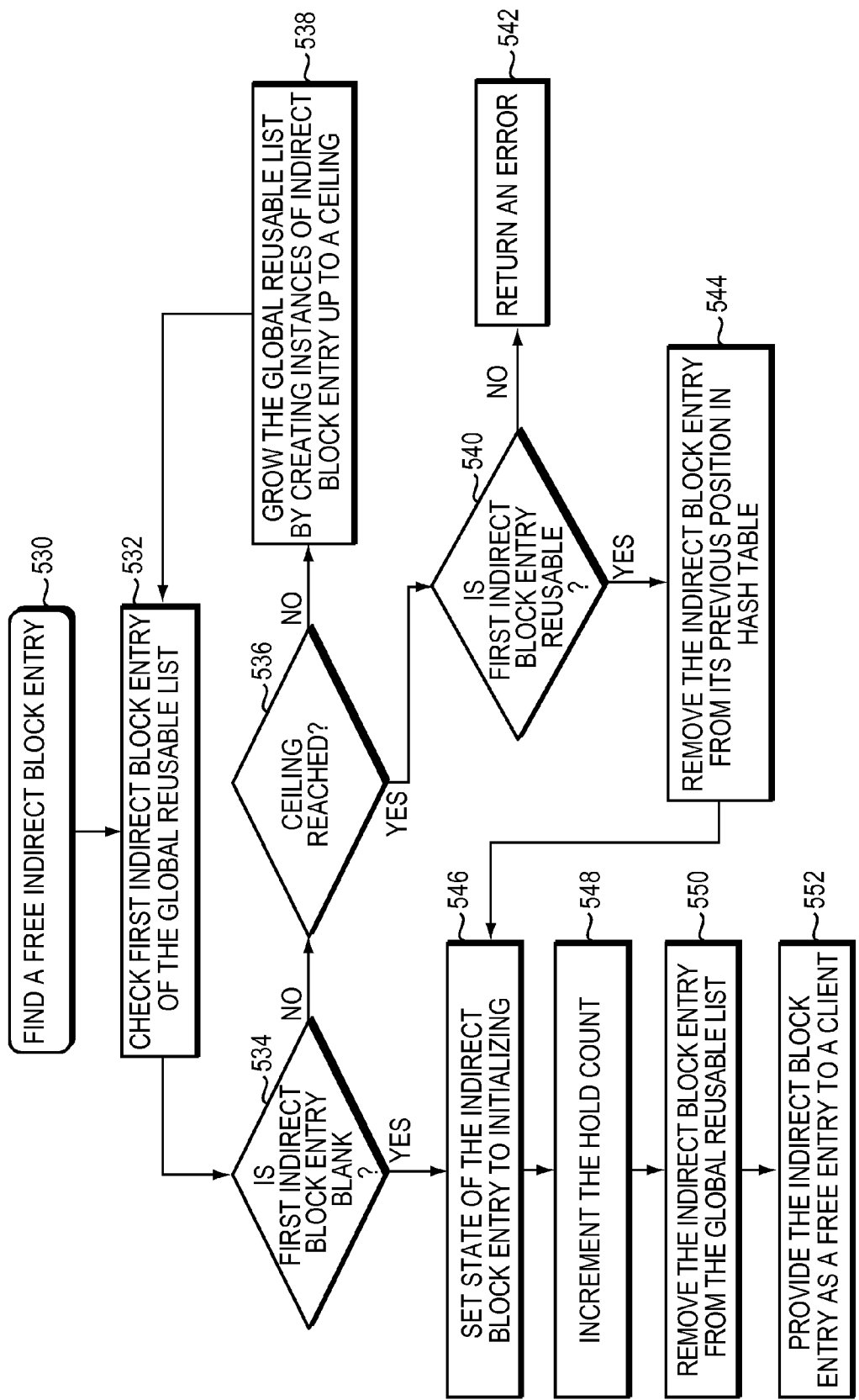

Referring to FIG. 27, shown is a flow diagram illustrating a flow of data in the data storage system. With reference also to FIG. 10, in at least one embodiment of the current technique, a method (e.g., "getFreeEntry" function) of class "IndBlkUsableList" 350 is used to provide an indirect block entry from the global reusable list 350 as a free indirect block entry to a client or user (step 530). The method first attempts to find a blank indirect block entry from the front of the global reusable list 350. If a blank indirect block entry is not found, the method attempts to find a reusable indirect block entry. In order to find a free indirect block entry, the state of a first indirect block entry residing at the front (also referred to as "head") of the global reusable list 350 is examined (step 532). If the state of the first indirect block entry is state "blank" 410 (step 534), the state of the first indirect block entry is updated to state "initializing" 412 (step 546). The hold count 391 of the first indirect block entry is incremented (step 548). The first indirect block entry is removed from the global reusable list 350 (step 550). The first indirect block entry is provided to the client or user as a free indirect block entry (step 552). However, if the state of the first indirect block entry is not state "blank" 410 at step 534 and a ceiling indicating the maximum number of indirect block entries that can be added to the global reusable list 350 has not reached (step 536), a number of instances of class "IndBlkEntry" 353 is created to add the number of indirect block entries to the global reusable list 350 such that the global reusable list 350 grows to include up to the maximum number of indirect block entries based on the ceiling (step 538). The method then attempts to find a blank indirect block entry from the front of the global reusable list 350 (step 532).

In at least one embodiment of the current technique, if the state of the first indirect block entry is state "reusable" 414 (step 540) and the ceiling indicating the maximum number of indirect block entries that can be added to the global reusable list 350 has reached, the first indirect block entry with the state "reusable" 414 is recycled as a free indirect block entry. The first indirect block entry is removed from its previous position in the hash table 354 (step 544) and the state of the first indirect block entry is updated to state "initializing" 412 (step 546). The hold count 391 of the first indirect block entry is incremented (step 548). The first indirect block entry is removed from the global reusable list 350 (step 550). The first indirect block entry is provided to the client or user as a free indirect block entry (step 552). However, if the state of the first indirect block entry is not state "reusable" 414 at step 540, an error is returned to the client or user (step 542).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing global metadata caches in data storage systems, the method comprising:

allocating space in a memory of a data storage system to a global metadata cache, configured to store metadata objects for a plurality of different file systems responsive to file system access requests from the plurality of different file systems, wherein each file system of the plurality of different file systems is associated with a local file system cache, wherein metadata information of a file system cached in a local file system cache associated with the file system refers to metadata cached in the global metadata cache;

associating a global reusable list with the global metadata cache; and storing a metadata object associated with a file of a file system of the plurality of different file systems in the global metadata cache by using a metadata object of the global reusable list, wherein the metadata object is accessed by a plurality of different versions of the file.

2. The method of claim 1, further comprising
associating the metadata object with a global reusable list based on a use recency information of the metadata object.

3. The method of claim 2, wherein the global reusable list includes a linked list, wherein the linked list includes a set of metadata objects, wherein each metadata object of the set of metadata objects is available as a free entry.

4. The method of claim 1, wherein the file of the file system of the plurality of different file systems is associated with an inode, wherein the inode of the file includes a set of indirect blocks, wherein each indirect block of the set of indirect blocks is represented by an indirect block entry.

5. The method of claim 4, wherein the metadata object stored in the global metadata cache includes an indirect block entry.

6. The method of claim 4, wherein the indirect block entry includes a committed buffer, a writeable buffer, a hold count, a state, and an access lock.

7. The method of claim 1, wherein a size of the global metadata cache is based on an amount of memory available in the data storage system.

8. The method of claim 1, further comprising:
updating a generation count of the metadata object associated with the file of the file system of the plurality of different file systems in the global metadata cache upon unmount of the file system.

9. The method of claim 2, further comprising:
receiving a request to access a metadata object of a file of a file system of the plurality of different file systems;
determining, whether to allocate a free entry from the global reusable list based on whether the metadata object is found in the global metadata cache;
based on the determination, allocating the free entry from the global reusable list;
based on the allocation, reading contents of the metadata object from a persistent storage into the free entry; and
adding the free entry in the global metadata cache.

10. The method of claim 6, further comprising:
receiving a request for a readable buffer associated with an indirect block entry;
incrementing the hold count of the indirect block entry;
incrementing a hold count of the committed buffer associated with the indirect block entry; and
providing a reference to the committed buffer as the readable buffer.

11. The method of claim 6, further comprising:
receiving a request for a writeable buffer associated with an indirect block entry;

creating a copy of the committed buffer associated with the indirect block entry; and
providing the copy as the writeable buffer.

12. The method of claim 6, further comprising:
receiving a request to release an indirect block entry;
decrementing the hold count of the indirect block entry; and
updating the state of the indirect block entry based on the hold count.

13. A system for use in managing global metadata caches in data storage systems, the system comprising:
first logic allocating space in a memory of a data storage system to a global metadata cache, configured to store metadata objects for a plurality of different file systems responsive to file system access requests from the plurality of different file systems, wherein each file system of the plurality of different file systems is associated with a local file system cache, wherein metadata information of a file system cached in a local file system cache associated with the file system refers to metadata cached in the global metadata cache;
second logic associating a global reusable list with the global metadata cache; and
third logic storing a metadata object associated with a file of a file system of the plurality of different file systems in the global metadata cache by using a metadata object of the global reusable list, wherein the metadata object is accessed by a plurality of different versions of the file.

14. The system of claim 13, further comprising
fourth logic associating the metadata object with a global reusable list based on a use recency information of the metadata object.

15. The system of claim 14, wherein the global reusable list includes a linked list, wherein the linked list includes a set of metadata objects, wherein each metadata object of the set of metadata objects is available as a free entry.

16. The system of claim 13, wherein the file of the file system of the plurality of different file systems is associated with an inode, wherein the inode of the file includes a set of indirect blocks, wherein each indirect block of the set of indirect blocks is represented by an indirect block entry.

17. The system of claim 16, wherein the metadata object stored in the global metadata cache includes an indirect block entry.

18. The system of claim 16, wherein the indirect block entry includes a committed buffer, a writeable buffer, a hold count, a state, and an access lock.

19. The system of claim 13, wherein a size of the global metadata cache is based on an amount of memory available in the data storage system.

20. The system of claim 13, further comprising:
fourth logic updating a generation count of the metadata object associated with the file of the file system of the plurality of different file systems in the global metadata cache upon unmount of the file system.

* * * * *